United States Patent
Duncan et al.

(10) Patent No.: US 8,186,757 B2
(45) Date of Patent: May 29, 2012

(54) CHILD RESTRAINT SYSTEM INCLUDING A STATIONARY SEAT SUPPORT AND A REMOVABLE JUVENILE VEHICLE SEAT ON THE SEAT SUPPORT

(75) Inventors: Michael C. Duncan, Zionsville, IN (US); Nathan W. Heisey, Columbus, IN (US)

(73) Assignee: Cosco Management, Inc., Wilmington, DE (US)

( * ) Notice: Subject to any disclaimer, the term of this patent is extended or adjusted under 35 U.S.C. 154(b) by 462 days.

(21) Appl. No.: 12/397,839

(22) Filed: Mar. 4, 2009

(65) Prior Publication Data

US 2010/0225150 A1    Sep. 9, 2010

(51) Int. Cl.
  *B60N 2/28*  (2006.01)
  *A47D 1/10*  (2006.01)
(52) U.S. Cl. .......... 297/256.13; 297/256.14; 297/256.16
(58) Field of Classification Search ............... 297/256.13–256.14, 256.16, 329, 297/341, 343, 344.11, 344.14; B60N 2/28
  See application file for complete search history.

(56) References Cited

U.S. PATENT DOCUMENTS

| | | | |
|---|---|---|---|
| 4,915,446 A | 4/1990 | Darling et al. | |
| 5,112,109 A | 5/1992 | Takada | |
| 5,236,221 A | 8/1993 | Minami | |
| 5,385,387 A | 1/1995 | Kain | |
| 5,478,135 A | 12/1995 | Kain | |
| 5,551,751 A | 9/1996 | Sedlack | |
| 5,609,393 A | 3/1997 | Meeker | |
| 5,890,762 A | 4/1999 | Yoshida | |
| 5,997,086 A | 12/1999 | Gibson et al. | |
| 6,070,890 A | 6/2000 | Haut et al. | |
| 6,196,629 B1 | 3/2001 | Onishi | |
| 6,428,099 B1 | 8/2002 | Kain | |
| 6,454,350 B1 | 9/2002 | Celestina-Krevh et al. | |
| 6,746,080 B2 * | 6/2004 | Tsugimatsu et al. ..... | 297/256.13 |
| 6,979,057 B2 | 12/2005 | Sedlack | |
| 7,086,695 B2 * | 8/2006 | Hosoya .................... | 297/256.16 |
| 7,246,855 B2 | 7/2007 | Langmaid | |
| 7,270,373 B2 | 9/2007 | Sakumoto | |
| 7,325,871 B2 * | 2/2008 | Gangadharan et al. .. | 297/256.16 |
| 7,484,801 B2 * | 2/2009 | Kassai et al. ............. | 297/256.16 |
| 7,699,393 B2 * | 4/2010 | Forbes et al. ............ | 297/216.11 |
| 2006/0261650 A1 * | 11/2006 | Billman et al. ........... | 297/250.1 |
| 2007/0080567 A1 * | 4/2007 | Konig et al. ............... | 297/250.1 |
| 2007/0210632 A1 | 9/2007 | Maciejczyk | |
| 2008/0136234 A1 | 6/2008 | Hutchinson et al. | |

FOREIGN PATENT DOCUMENTS

| | | | |
|---|---|---|---|
| DE | 3505010 A1 * | 8/1986 | |
| GB | 2405085 A * | 2/2005 | |
| JP | 07164939 A * | 6/1995 | |
| JP | 2005028942 A * | 2/2005 | |
| JP | 2005028943 A * | 2/2005 | |

* cited by examiner

*Primary Examiner* — David Dunn
*Assistant Examiner* — Tania Abraham
(74) *Attorney, Agent, or Firm* — Barnes & Thornburg LLP

(57) ABSTRACT

A child restraint including a seat support and a juvenile vehicle seat removably coupled to the seat support. The juvenile vehicle seat may be reclined with respect to the seat support.

16 Claims, 14 Drawing Sheets

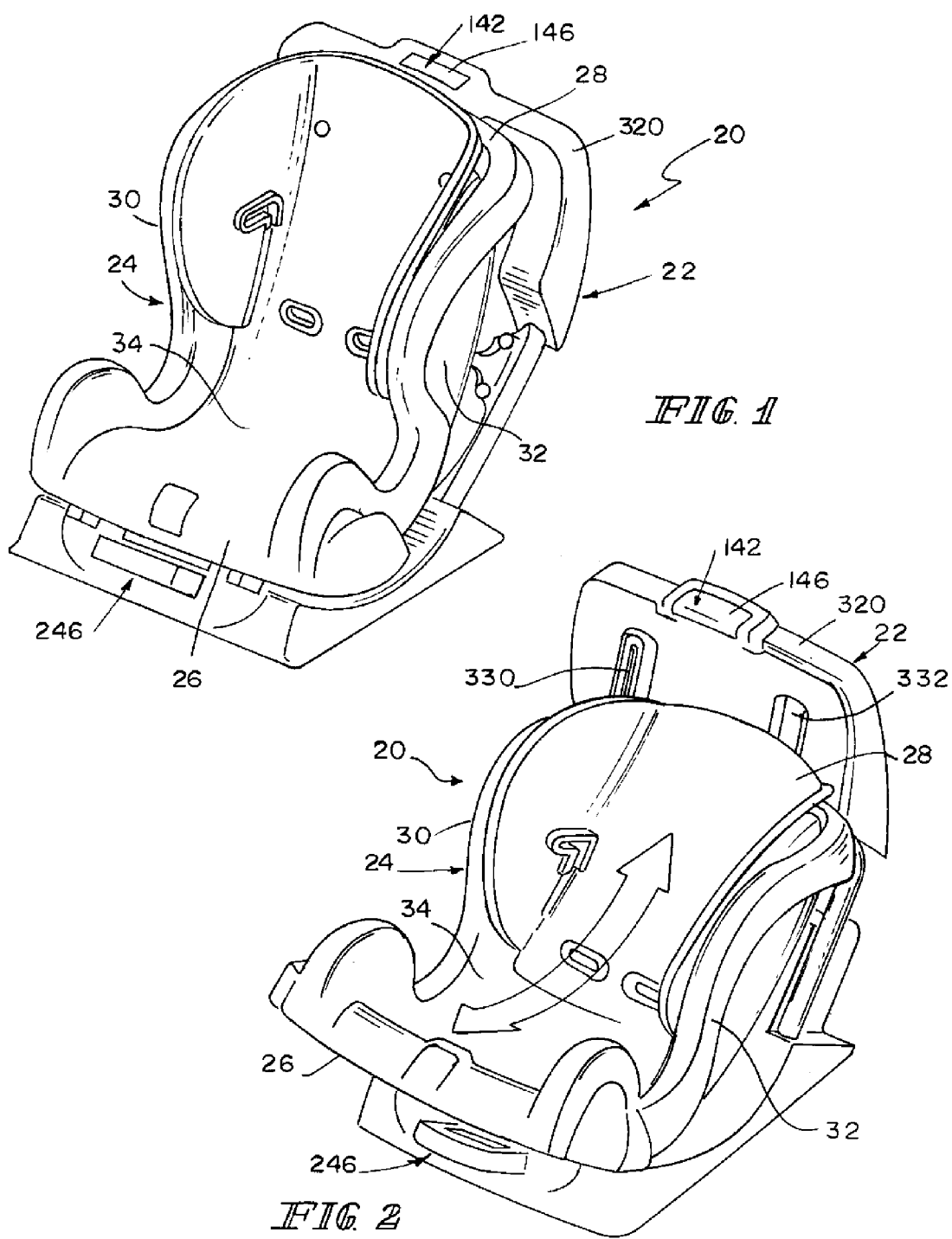

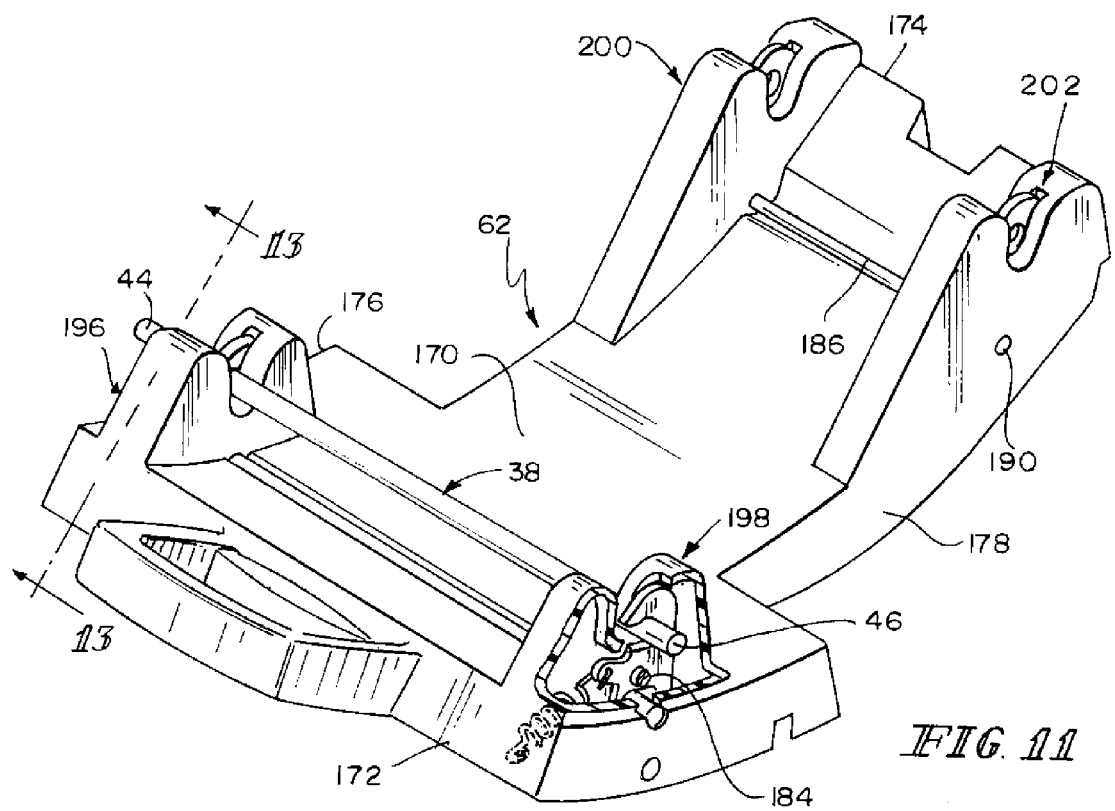
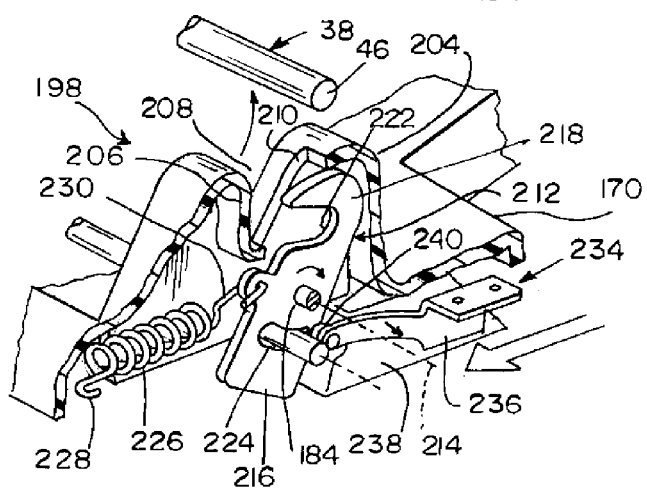

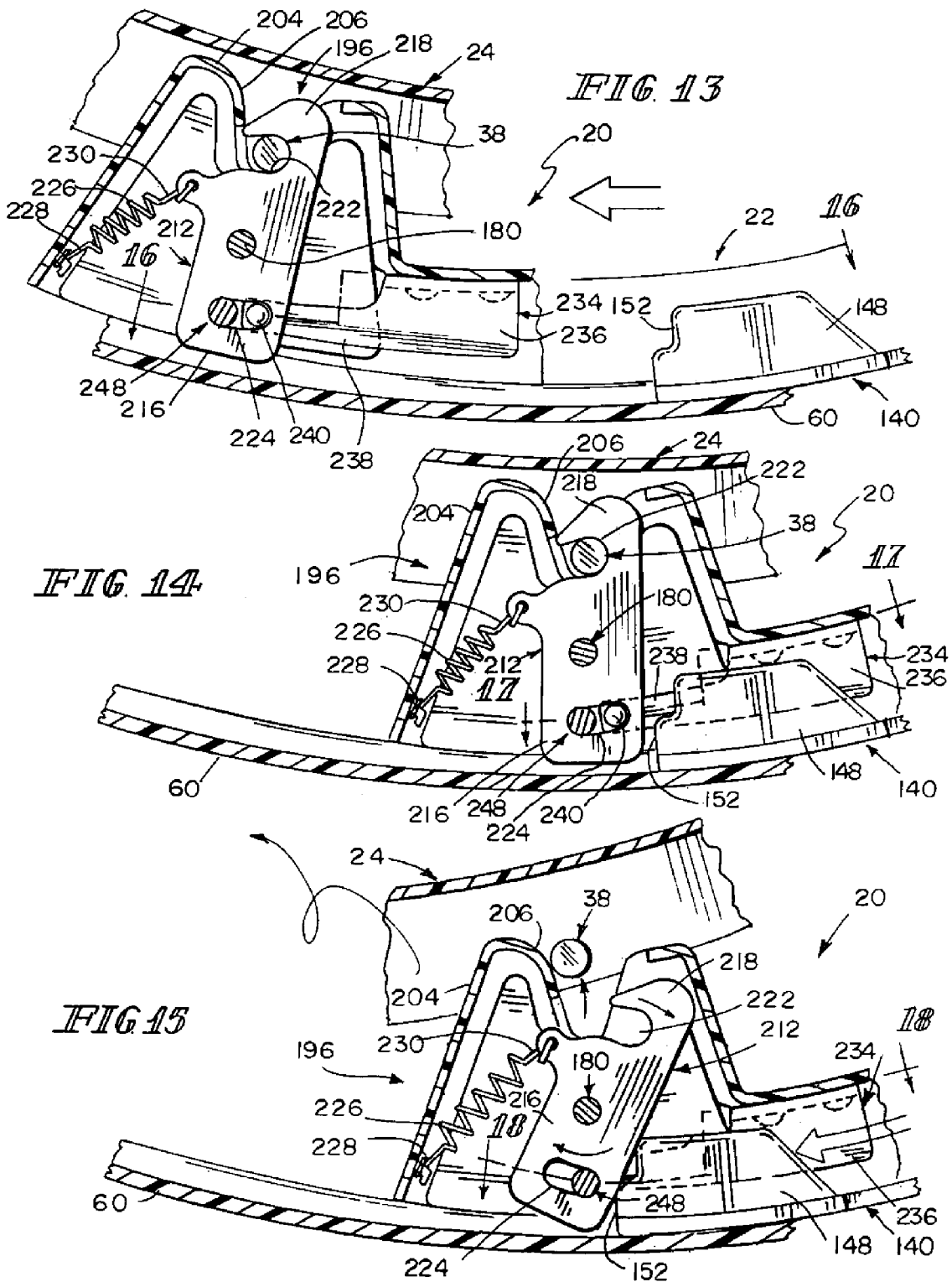

CHILD RESTRAINT SYSTEM INCLUDING A STATIONARY SEAT SUPPORT AND A REMOVABLE JUVENILE VEHICLE SEAT ON THE SEAT SUPPORT

BACKGROUND

The present disclosure relates to child restraints, and particularly to a child restraint including a juvenile vehicle seat mounted to a seat support. More particularly, the present disclosure relates to a positioning system for positioning the juvenile vehicle seat with respect to the seat support.

SUMMARY

According to the present disclosure, a child restraint includes a seat support and a juvenile vehicle seat configured to be mounted to the seat support. The juvenile vehicle seat is selectively positionable with the respect to the seat support between a fully upright position and a fully reclined position.

In the illustrative embodiments, the seat support includes a base, a lower yoke coupled to the base for movement between a fully upright position and a fully reclined position, and an upper yoke coupled to the base for movement between a fully upright position and a fully reclined position. The juvenile vehicle seat is coupled to the lower yoke and to the upper yoke when the juvenile vehicle seat is in a front-facing position with respect to the seat support and is coupled only to the lower yoke when the juvenile vehicle seat is in a rear-facing position with respect to the seat support. The juvenile vehicle seat is removable from the lower yoke only when the lower yoke is in the fully upright position of the lower yoke.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view showing an illustrative child restraint in accordance with the present disclosure wherein the child restraint includes a juvenile vehicle seat mounted to a seat support with the juvenile vehicle seat located in a front-facing fully upright position with respect to the seat support wherein the juvenile vehicle seat may be removed from the seat support;

FIG. 2 is a perspective view of the child restraint shown with the juvenile vehicle seat in a front-facing fully reclined position with respect to the seat support wherein the juvenile vehicle seat can not be removed from the seat support and suggesting that the juvenile vehicle seat is adjustably positionable with respect to the seat support between the fully upright position of FIG. 1 and the fully reclined position of FIG. 2;

FIG. 11 is a partially cut away perspective view of the lower yoke showing the bottom locking member of the juvenile vehicle seat coupled to the lower yoke by a hook member of the lower latch mechanism, the hook member shown biased to a locked position in engagement with the lower locking member by a biasing member;

FIG. 12 is an enlarged partial section of a lower latch mechanism showing the lower detent member released from the hook member of the lower latch mechanism by the lower actuator of the release mechanism and showing the hook member of the lower latch mechanism pivoted to a released position by the lower actuator of the release mechanism when the release member is moved to the extended position such that the lower locking member of the juvenile vehicle seat may be removed from the lower latch mechanism;

FIGS. 13-18 is a sequence of views showing the lower actuator of the release mechanism moving from the retracted position toward the extended position with respect to the lower detent mechanism and lower latch mechanism of the lower yoke when the lower yoke is in the fully upright position.

FIGS. 13 and 16 show the lower actuator in the retracted position and configured to be moved toward the extended position and toward the lower detent mechanism and lower latch mechanism.

FIGS. 14 and 17 show the lower actuator engaging the lower detent mechanism and releasing the lower detent mechanism from the lower latch mechanism.

FIGS. 15 and 18 show the lower actuator pivoting the hook member of the lower latch mechanism from the locked position to the released position when the lower actuator is in the extended position;

FIG. 13 is a side sectional view taken along line 13-13 of FIG. 11 showing the lower yoke in the fully upright position with the lower locking member of the juvenile vehicle seat coupled to the hook member of the lower latch mechanism and showing the lower detent mechanism coupled to the hook member of the lower latch mechanism to prevent the hook member of the lower latch mechanism from pivoting from the locked position as shown in FIG. 13 toward a released position, and showing the lower actuator of the release mechanism in the retracted position;

FIG. 14 is a side sectional view showing the lower actuator of the release mechanism moved from the retracted position toward the extended position and showing the lower actuator engaging the lower detent mechanism to release the lower detent mechanism from the hook member of the lower latch mechanism;

FIG. 15 is a side sectional view showing the lower actuator of the release mechanism in the extended position and in engagement with the hook member of the lower latch mechanism such that the lower actuator pivoted the hook member from the locked position to the released position such that the bottom locking member of the juvenile vehicle seat is released from the lower latch mechanism;

FIG. 16 is a top sectional view showing the lower guide rod of the lower yoke extending through a slot in the hook member of the lower latch mechanism, and showing a detent of the lower detent mechanism located in the slot of the hook member to prevent the hook member from pivoting from the locked position toward the released position, and showing the lower actuator of the release mechanism in the retracted position;

FIG. 17 is a top section view showing the lower actuator of the release mechanism moved from the retracted position toward the extended position and engaging the lower detent mechanism to remove the detent from the slot of the hook member of the lower latch mechanism;

FIG. 18 is a top section view showing the lower actuator of the release mechanism in the extended position and in engagement with the hook member of the lower latch mechanism such that the hook member is pivoted to the released position by the lower actuator;

DETAILED DESCRIPTION

Figure 3:
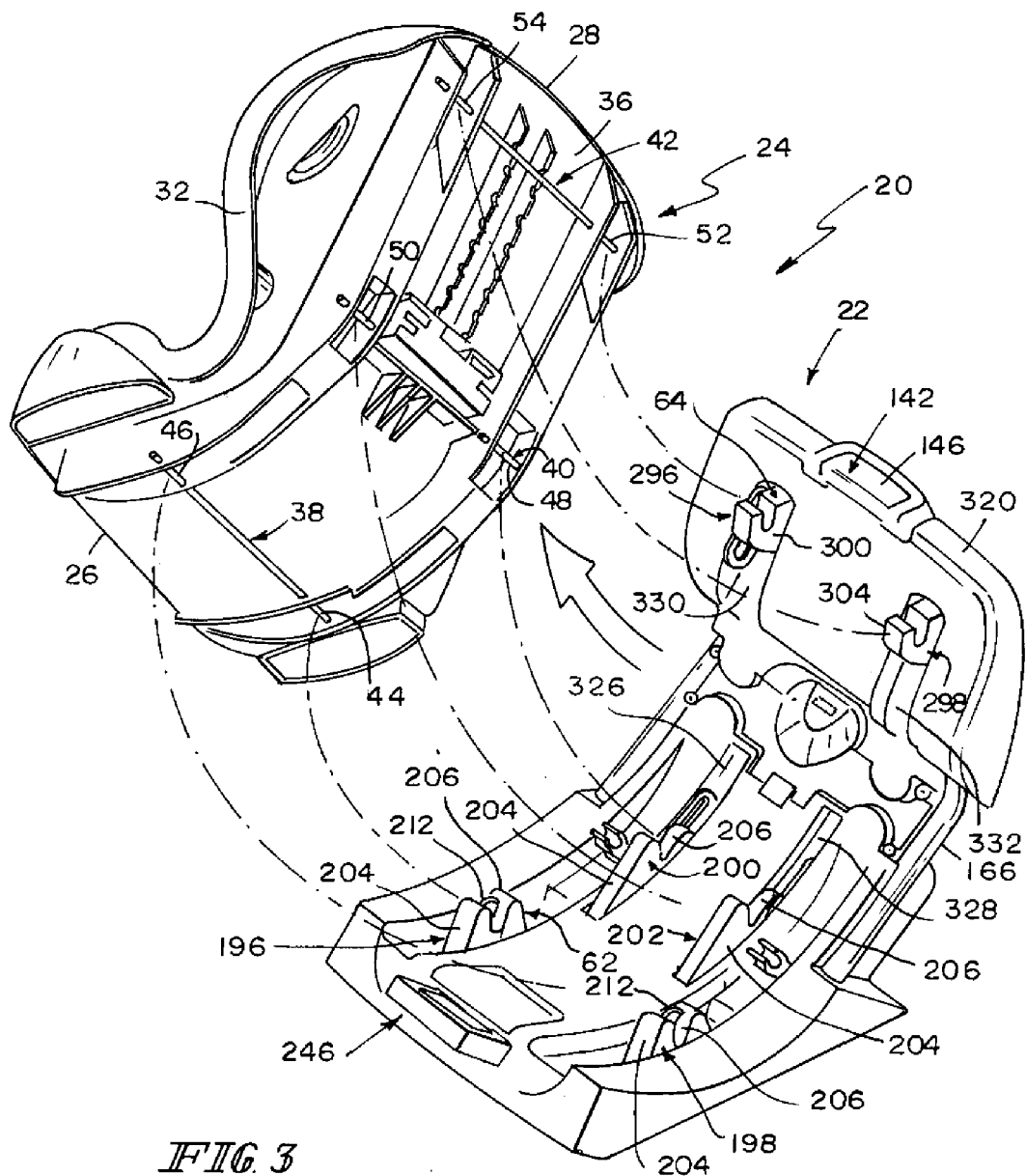
FIG. 3 is an exploded perspective view of the child restraint with the juvenile vehicle seat removed from the seat support and showing the rear of the juvenile vehicle seat including an upper locking member, an intermediate locking member, and a lower locking member, and the seat support including an upper yoke having an upper latch mechanism for receiving the upper locking member when the juvenile vehicle seat is in the front-facing position and a lower yoke having an intermediate latch mechanism and a lower latch mechanism for receiving the lower locking member of the juvenile vehicle seat when the juvenile vehicle seat is in the front-facing position.
Figure 4:
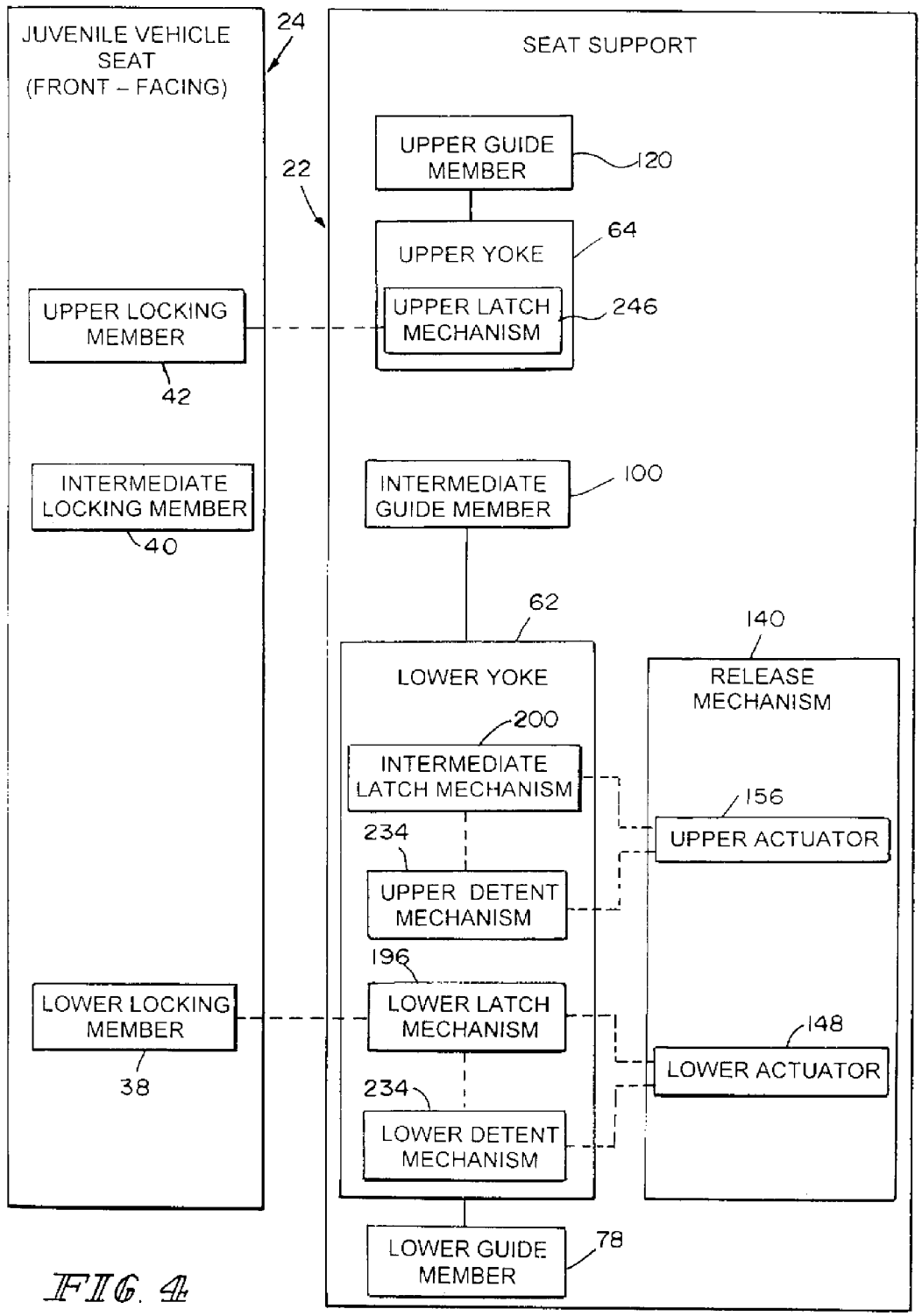
FIG. 4 is a diagrammatic view of the child restraint in accordance with the present disclosure, the child restraint including a front-facing juvenile vehicle seat having an upper locking member, an intermediate locking member and a lower locking member, and a seat support including an upper yoke coupled to an upper guide member, the upper yoke including a top latch mechanism configured to receive the upper locking member of the juvenile vehicle seat when the juvenile vehicle seat is in the front-facing position, and a lower yoke coupled to an intermediate guide member and a lower guide member, the lower yoke including an intermediate latch mechanism and a lower latch mechanism configured to receive the lower locking member of the juvenile vehicle seat when the juvenile vehicle seat is in the front-facing position, the lower yoke including an upper detent mechanism and a lower detent mechanism for releasably locking the lower locking member of the juvenile vehicle seat to the lower latch mechanism when the juvenile vehicle seat is in the front-facing position, the seat support further including a release mechanism having an upper actuator configured to actuate the upper detent mechanism of the intermediate latch mechanism and a lower actuator configured to actuate the lower detent mechanism of the lower latch mechanism when the juvenile vehicle seat is in the fully upright position to selectively release the lower locking member of the juvenile vehicle seat from the lower latch mechanism.

A child restraint 20 is shown in FIG. 1 including a seat support 22 configured to receive a juvenile vehicle seat 24 such that juvenile vehicle seat 24 is removably coupled to seat support 22. Seat support 22 is adapted to sit on an underlying vehicle seat of a vehicle and is adapted to be anchored stationarily to the vehicle seat. As shown in FIGS. 1 and 2, juvenile vehicle seat 24 is coupled to seat support 22 in a front-facing position with respect to seat support 22. As suggested by the arrow in FIG. 2, juvenile vehicle seat 24 is longitudinally movable with respect to seat support 22 between a fully upright position of juvenile vehicle seat 24 and a fully reclined position of juvenile vehicle seat 24.

Juvenile vehicle seat 24 extends from a bottom end 26 to a top end 28 and between a left side 30 and a right side 32. Juvenile vehicle seat 24 includes a front 34 configured to receive a juvenile and a rear 36 configured to be coupled to seat support 22. Rear 36 of juvenile vehicle seat 24 includes a lower locking member 38, an intermediate locking member 40, and an upper locking member 42. Lower locking member 38 comprises an elongate generally linear and cylindrical rod having a first end 44 and a second end 46. Intermediate locking member 40 comprises an elongate generally linear and cylindrical rod having a first end 48 and a second end 50. Upper locking member 42 comprises an elongate generally linear and cylindrical rod having a first end 52 and a second end 54. Lower locking member 38 is located adjacent bottom end 26 of juvenile vehicle seat 24 and upper locking member 42 is located adjacent top end 28 of juvenile vehicle seat 24. Intermediate locking member 40 is located between lower locking member 38 and upper locking member 42. Lower locking member 38, intermediate locking member 40 and upper locking member 42 are spaced apart and generally parallel to one another and extend generally transversely between left side 30 and right side 32 of juvenile vehicle seat 24.

Seat support 22 of child restraint 20 includes a base 60, a lower yoke 62 coupled to base 60, and an upper yoke 64 coupled to base 60. Lower yoke 62 is coupled to base 60 for selective longitudinal sliding movement with respect to base 60 between a fully upright position of lower yoke 62 and a fully reclined position of lower yoke 62. Upper yoke 64 is slidably coupled to base 60 for selective longitudinal sliding movement with respect to base 60 between a fully upright position of upper yoke 64 and a fully reclined position of upper yoke 64. Lower yoke 62 and upper yoke 64 are selectively slidably movable with respect to base 60 independent of one another.

Base 60 of seat support 22 includes bottom end 70, a top end 72, a left side 74, and a right side 76. Base 60 includes a first lower guide member 78 and a spaced apart and generally parallel second lower guide member 80 located adjacent bottom end 70 of base 60. First lower guide member 78 is located adjacent left side 74 and second lower guide member 80 is located adjacent right side 76 of base 60. First lower guide member 78 and second lower guide member 80 each comprise an upwardly extending generally planar plate member. First lower guide member 78 includes an elongate curved slot 82 having a first end 84 and a second end 86 located adjacent a top end of first lower guide member 78. First lower guide member 78 also includes a plurality of locking apertures 88A-D located below and spaced apart from one another along the length of slot 82. Second lower guide member 80 includes an elongate curved slot 90 having a first end 92 and a second end 94. Slot 90 is located adjacent the top end of second lower guide member 80 and extends generally parallel to slot 82. Slot 90 is generally transversely aligned with slot 82. Second lower guide member 80 includes a plurality of locking apertures 96A-D located below slot 90 and spaced apart from one another along the length of slot 90. Each locking aperture 96A-D of second lower guide member 80 is aligned transversely with a respective locking aperture 88A-D of first lower guide member 78.

Base 60 also includes a first intermediate guide member 100 and a spaced apart and generally parallel second intermediate guide member 102. First intermediate guide member 100 is spaced apart from bottom end 70 and top end 72 of base 60 and is located adjacent left side 74. Second intermediate guide member 102 is spaced apart from bottom end 70 and top end 72 of base 60 and is located adjacent right side 76. First and second intermediate guide members 100 and 102 are aligned transversely with respect to one another. First intermediate guide member 100 includes an elongate curved slot 104 having a first end 106 and a second end 108. Second intermediate guide member 102 includes a elongate curved slot 110 having a first end 112 and a second end 114. Slot 110 is generally parallel to slot 104 and is aligned transversely with slot 104. First and second intermediate guide members 100 and 102 are located more closely to a central longitudinal axis of base 60 than are first and second lower guide members 78 and 80. First and second lower guide members 78 and 80 are thereby spaced farther apart from one another than first and second intermediate guide members 100 and 102 are spaced apart from one another.

Base 60 also includes a first upper guide member 120 and a second upper guide member 122 located adjacent top end 72 of base 60. First upper guide member 120 is located adjacent left side 74 and second upper guide member 122 is located adjacent right side 76 of base 60. First and second upper guide members 120 and 122 are spaced apart from one another and generally parallel to one another. First upper guide member 120 includes an elongate curved slot 124 having a first end 126 and a second end 128. Second upper guide member 122 includes an elongate curved slot 130 having a first end 132 and a second end 134. Slot 130 of second upper guide member 122 is generally parallel to slot 124 and is aligned transversely with slot 124 of first upper guide member 120.

Seat support 22 includes a release mechanism 140 overlying base 60. Release mechanism 140 extends along the central longitudinal axis of base 60 from a top end 142 located adjacent top end 72 of base 60 downwardly toward bottom end 70 of base 60 to a bottom end 144. Top end 142 of release mechanism 140 includes an operating member 146. Bottom end 144 of release mechanism 140 includes a first lower actuator 148 and a transversely spaced apart second lower actuator 150. First lower actuator 148 and second lower actuator 150 each comprise an outwardly projecting member having an end wall 152 and a side wall 154. First lower actuator 148 is associated with first lower guide member 78 and second lower actuator 150 is associated with second lower guide member 80. Release mechanism 140 also includes a first upper actuator 156 and a second upper actuator 158 that are transversely spaced apart from one another and that are located between top end 142 and bottom end 144 of release mechanism 140. First upper actuator 156 and second upper actuator 158 each comprise a projecting member having an end wall 160 and a side wall 162. First upper actuator 156 is associated with first intermediate guide member 100 and second upper actuator 158 is associated with second intermediate guide member 102. Release mechanism 140 is selectively linearly slidable with respect to base 60 along the longitudinal axis of base 60 between a retracted position and an extended position. Release mechanism 140 is selectively moved to the extended position by manually pressing downwardly on operating member 146. Base 60 also includes a generally U-shaped tubular frame 166 that overlies the top surface of base 60. Frame 166 provides stiffness and rigidity to seat support 22.

Lower yoke 62 of seat support 22 includes a body 170 having a bottom end 172, a top end 174, a left side 176, and a right side 178. A generally linear and elongate lower guide rod 180 is attached to body 170 adjacent bottom end 172 and extends generally transversely between first lower guide member 78 and second lower guide member 80 of base 60. Body 170 overlies release mechanism 140 and base 60. Lower guide rod 180 includes a first end 182 that extends outwardly from left side 176 of body 170 and a second end 184 that extends outwardly from right side 178 of body 170. First end 182 of lower guide rod 180 extends into slot 82 of first lower guide member 78 and is associated operatively with first lower guide member 78 such that first end 182 is slidable within slot 82 between first end 84 and second end 86. Second end 184 of lower guide rod 180 extends into slot 90 of second lower guide member 180 and is associated operatively with second lower guide member 180 such that second end 184 is slidable within slot 90 between first end 92 and second end 94.

A generally linear and elongate intermediate guide rod 186 is coupled to body 170 adjacent top end 174 generally parallel to lower guide rod 180. Intermediate guide rod 186 extends generally transversely between first intermediate guide member 100 and second intermediate guide member 102. Intermediate guide rod 186 includes a first end 188 that extends outwardly from left side 176 of body 170 and a second end 190 that extends outwardly from right side 178 of body 170. First end 188 of intermediate guide rod 186 is located within slot 104 of first intermediate guide member 100 and is associated operatively with first intermediate guide member 100 such that first end 188 is slidable within slot 104 between first end 106 and second end 108. Second end 190 of intermediate guide rod 186 is located within slot 110 of second intermediate guide member 102 and is associated operatively with second intermediate guide member 102 such that second end 190 is slidable within slot 110 between first end 112 and second end 114. First and second lower guide members 78 and 80 and first and second intermediate guide members 100 and 102 couple lower yoke 62 to base 60 while enabling lower yoke 62 to be selectively positionable and movable parallel to the longitudinal axis of base 60 and with respect to base 60 between the fully upright position of lower yoke 62 and the fully reclined position of lower yoke 62. When lower yoke 62 is in the fully upright position, first end 182 of lower guide rod 180 is located adjacent first end 84 of slot 82, second end 184 of lower guide rod 180 is located adjacent first end 92 of slot 90, first end 188 of intermediate guide rod 186 is located adjacent first end 106 of slot 104 and second end 190 of intermediate guide rod 186 is located adjacent first end 112 of slot 110. When lower yoke 62 is in the fully reclined position, first end 182 of lower guide rod 180 is located adjacent second end 86 of slot 82, second end 184 of lower guide rod 180 is located adjacent second end 94 of slot 90, first end 188 of intermediate guide rod 186 is located adjacent second end 108 of slot 104 and second end 190 of intermediate guide rod 186 is located adjacent second end 114 of slot 110.

Lower yoke 62 includes a first lower latch mechanism 196, a second lower latch mechanism 198, a first intermediate latch mechanism 200, and a second intermediate latch mechanism 202. First lower latch mechanism 196 is located adjacent bottom end 172 and left side 176 of body 170. Second lower latch mechanism 198 is located adjacent bottom end 172 and right side 178 of body 170. First intermediate latch mechanism 200 is located adjacent top end 174 and left side 176 of body 170. Second intermediate latch mechanism 202 is located adjacent top end 174 and right side 178 of body 170. First and second lower latch mechanisms 196 and 198 and first and second intermediate latch mechanisms 200 and 202 are constructed and operate in generally the same manner as one another such that similar parts are provided with the same reference number. Each lower and intermediate latch mechanism 196, 198, 200, and 202 includes a forked member 204 having a generally U-shaped wall 206 forming a receptacle 208 and including a slot 210. As shown in FIG. 12, second lower latch mechanism 198 includes a hook member 212 coupled to second end 184 of lower guide rod 180 for pivotable movement about a central longitudinal axis 214 of lower guide rod 180 between a locked position as shown in FIG. 11 wherein hook member 212 extends through slot 210 and a released position as shown in FIG. 12. Hook member 212 of first lower latch mechanism 196 similarly is coupled to first end 182 of lower guide rod 180 for pivotable movement about axis 214 between a locked position and a released position. Hook member 212 of first intermediate latch mechanism 200 is coupled to first end 188 of intermediate guide rod 186 and hook member 212 of second intermediate latch mechanism 202 is coupled to second end 190 of intermediate guide rod 186 for pivotable movement about a central longitudinal axis 220 of intermediate guide rod 186.

Each hook member 212 includes a bottom end 216 and top end 218. Top end 218 of hook member 212 includes an open throat or open end slot 222. Bottom end 216 of hook member 212 in first and second lower latch mechanisms 196 and 198 includes an aperture such as an elongate curved slot 224. Bottom end 216 of hook member 212 in first and second intermediate latch mechanisms 200 and 202 includes an aperture such as a circular aperture 225. A resilient biasing member 226 such as a helical coil tension spring has a first end 228 coupled to body 170 and a second end 230 coupled to hook member 212. Biasing member 226 resiliently biases hook member 212 from the released position toward the locked position while allowing hook member 212 to pivot from the locked position to the released position.

Figure 8:
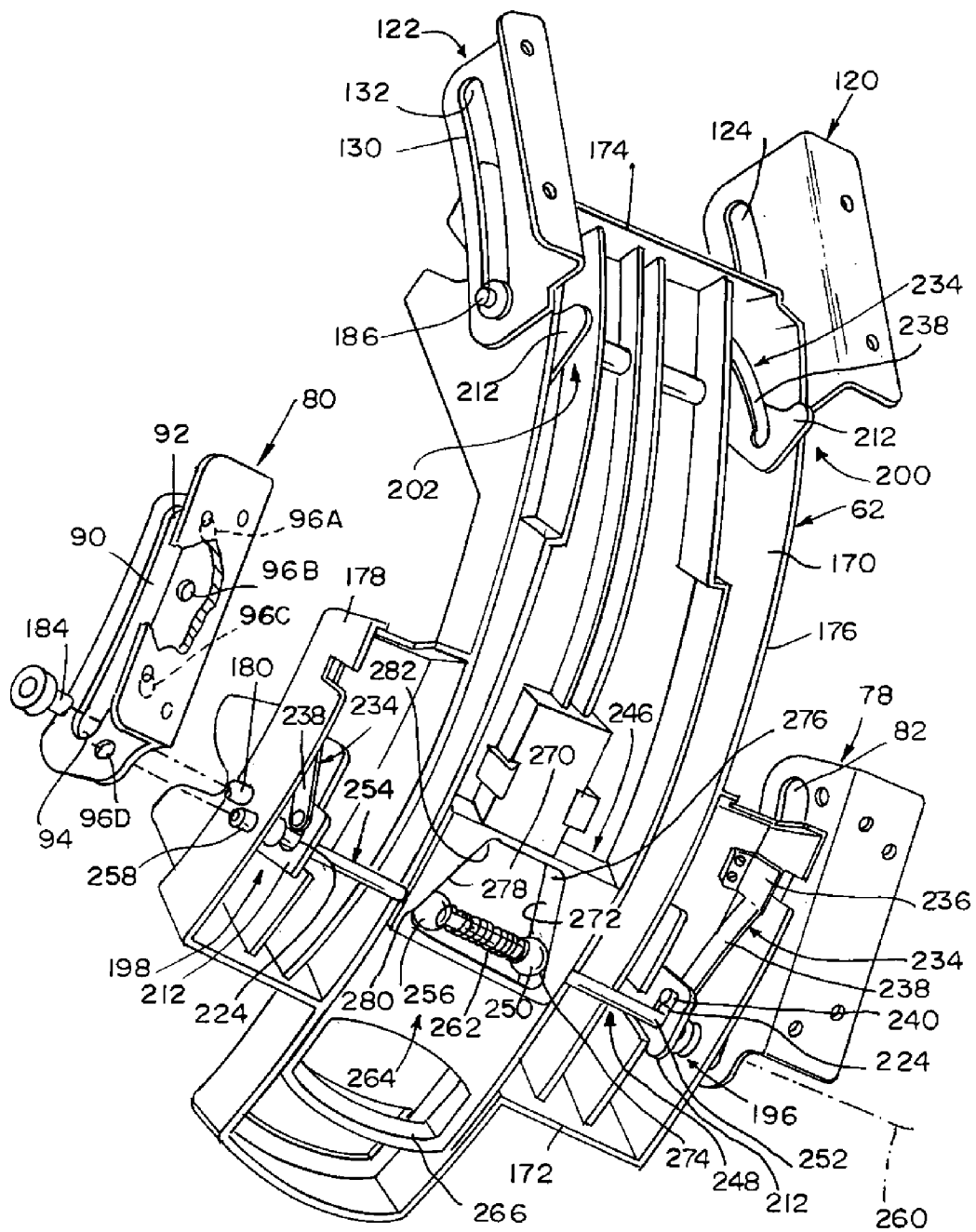
FIG. 8 is a partial exploded bottom view of the lower yoke, the intermediate guide members, and the lower guide members, the lower yoke including a recline adjustment mechanism having an actuator coupled to a handle, a first locking pin having a distal end and a proximal end coupled to the actuator, and a second locking pin having a distal end and a proximal end coupled to the actuator, wherein the distal end of the first locking pin is configured to be located within a selected one of the locking apertures of a first lower guide member when the first locking pin is in an extended position and the distal end of the second locking pin is configured to be located within a selected one of the locking apertures of a second lower guide member when the second locking pin is in an extended position such that the lower yoke is locked in place with respect to the lower guide members and the base of the seat support, the handle is configured to manually move the actuator from a locked position wherein the locking pins are in the extended positions and a released position wherein the locking pins are moved by the actuator to a retracted position wherein the locking pins are disengaged from the locking apertures of the lower guide members, the recline adjustment mechanism further including a biasing member coupled to the proximal ends of the first and second locking pins, the biasing member biasing the first and second locking pins toward the extended positions and biasing the actuator and the handle toward the locked position.

Second lower latch mechanism 198, as shown in FIGS. 8 and 12, includes a detent mechanism 234 associated with hook member 212. Detent mechanism 234 includes a mounting base 236 coupled to body 170 and a resiliently flexible arm member 238 having a proximal end coupled to mounting base 236 and a distal end including a detent 240. Arm member 238 is configured to bias resiliently detent 240 into slot 224 of hook member 212 when hook member 212 is in the locked position to prevent pivotable movement of hook member 212 from the locked position toward the released position. First lower latch mechanism 196 also includes a detent mechanism 234 that operates in the same manner in connection with hook member 212 of first lower latch mechanism 196. First and second intermediate latch mechanisms 200 and 202 each also include a detent mechanism 234 that operates in the same manner in connection with hook members 212 of first and second intermediate latch mechanisms 200 and 202 other than that detents 240 are configured to be inserted into apertures 225 of hook members 212 in first and second intermediate latch mechanisms 200 and 202.

Seat support 22 includes a recline locking mechanism 246 for releasably locking lower yoke 62 in a selected position with respect to base 60 between the fully upright position and the fully reclined position of lower yoke 62. Recline locking mechanism 246 includes a first locking pin 248 having a proximal end 250 and a distal end 252 and a second locking pin 254 having a proximal end 256 and a distal end 258. First and second locking pins 248 and 254 are coaxially aligned with one another along a central longitudinal axis 260. A resilient biasing member 262 such as a helical compression spring extends along axis 260 between proximal end 250 of first locking pin 248 and proximal end 256 of second locking pin 254. First locking pin 248 and second locking pin 254 are each movable between a retracted position and an extended position. Biasing member 262 resiliently biases first locking pin 248 and second locking pin 254 from the retracted position toward the extended position. When first locking pin 248 and second locking pin 254 are in the extended position, distal end 252 of first locking pin 248 is located within a selected one of locking apertures 88A-D and distal end 258 of second locking pin 254 is located in a counterpart locking aperture 96A-D transversely aligned with the locking aperture in which distal end 252 of first locking pin 248 is inserted.

Recline locking mechanism 246 also includes a manually operated actuator 264 slidably coupled to the bottom of body 170 for movement between a locked position and a released position. Actuator 264 includes a handle 266 for manual operation. Actuator 264 also includes a recess 270 having a first side wall 272 extending generally linearly between a first end 274 and a second end 276 and a second side wall 278 extending generally linearly between a first end 280 and a second end 282. First side wall 272 and second side wall 278 are spaced apart from one another and are inclined or angled toward one another such that second ends 276 and 282 are located more closely adjacent to one another than are first ends 274 and 280 of first and second side walls 272 and 278. First locking pin 248 extends through an elongate slot in first side wall 272 and through slot 224 in hook member 212 of first lower latch mechanism 196. An enlarged portion of first locking pin 248 at proximal end 250 is biased into engagement with first side wall 272 by biasing member 262. Second locking pin 254 extends through an elongate slot in second side wall 278 and through slot 224 in hook member 212 of second lower latch mechanism 198. Proximal end 256 of second locking pin 254 includes an enlarged portion that is biased into engagement with second side wall 278 by biasing member 262.

When actuator 264 of recline locking mechanism 246 is moved from the locked position toward the released position, first side wall 272 slides along proximal end 250 of first locking pin 248 from first end 274 toward second end 276 and second side wall 278 slides along proximal end 256 of second locking pin 254 from first end 280 toward second end 282 while compressing biasing member 262. First side wall 272 moves first locking pin 248 from the extended position to the retracted position as first side wall 272 slides along proximal end 250 of first locking pin 248 from first end 274 towards second end 276. Similarly, at the same time, second locking pin 254 is moved from the extended position toward the retracted position as second side wall 278 slides along proximal end 256 of second locking pin 254 from first end 280 to second end 282. When handle 266 is released, biasing member 262 biases actuator 264 toward the locked position and biases first and second locking pins 248 and 254 toward their extended positions.

Upper yoke 64 of seat support 22 includes a body 290 having a first end 292 and a second end 294. A first upper latch mechanism 296 is coupled to first end 292 and a second upper latch mechanism 298 is coupled to second end 294 of body 290. First upper latch mechanism 296 includes a forked member 300 having a U-shaped wall 302 forming an open-end receptacle. Second upper latch mechanism 298 includes a forked member 304 having a U-shaped wall 306 forming an open-end receptacle. A generally linear and elongate upper guide rod 308 having a first end 310 and a second end 312 is coupled to body 290 of upper yoke 64. First end 310 of upper guide rod 308 extends outwardly from first end 292 of body 290 and is located within slot 124 of first upper guide member 120. Second end 312 of upper guide rod 308 extends outwardly from second end 294 of body 290 and is located within slot 130 of second upper guide member 122. First end 310 of upper guide rod 308 is slidable within slot 124 between first end 126 and second end 128 and second end 312 of upper guide rod 308 is slidable within slot 130 between first end 132 and second end 134. Upper yoke 64 is coupled to base 60 of seat support 22 for slidable longitudinal movement between a fully upright position wherein first end 310 of upper guide rod 308 is located adjacent first end 126 of slot 124 of first upper guide member 120 and second end 312 of upper guide rod 308 is located adjacent first end 132 of slot 130 of second upper guide member 122, and a fully reclined position wherein first end 310 of upper guide rod 308 is located adjacent second end 128 of slot 124 of first upper guide member 120 and second end 312 of upper guide rod 308 is located adjacent second end 134 of slot 130 of second upper guide member 122. One or more resilient biasing members 314 have a first end coupled to base 60 and a second end coupled to body 290 of upper yoke 64. Biasing members 314 resiliently bias upper yoke 64 from the fully reclined position of upper yoke 64 to the fully upright position of upper yoke 64.

Seat support 22 also includes a shell 320 configured to overlie base 60, release mechanism 140, lower yoke 62, upper yoke 64, and frame 166 and to be coupled to base 60. Shell 320 includes a first lower slot 322 through which fork member 204 and hook member 212 of first lower latch mechanism 196 extend and are slidable within, and a second lower slot 324 through which forked member 204 and hook member 212 of second lower latch mechanism 198 extend and are slidable within. Shell 320 includes a first intermediate slot 326 through which forked member 204 and hook member 212 of first intermediate latch mechanism 200 extend and are slidable within, and a second intermediate slot 328 through which forked member 204 and hook member 212 of second intermediate latch mechanism 202 extend and are slidable within. Shell 320 also includes a first upper slot 330 through which forked member 300 of first upper latch mechanism 296 extends and is slidable within, and a second upper slot 332 through which forked member 304 of second upper latch mechanism 298 extends and is slidable within.

Figure 5:
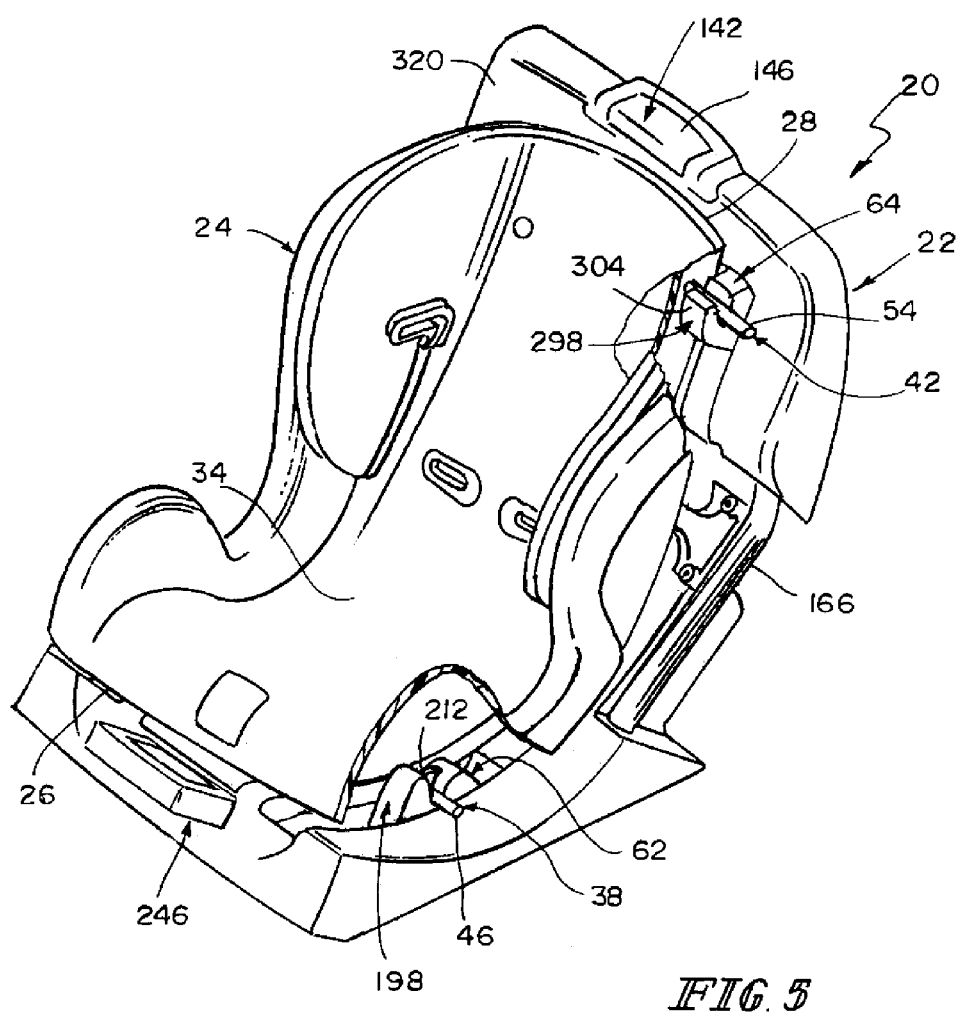
FIG. 5 is a partial perspective view of the child restraint of the present disclosure showing the juvenile vehicle seat coupled to the seat support in a front-facing position and showing the upper locking member of the juvenile vehicle seat coupled to the upper latch mechanism of the upper yoke of the seat support and showing the lower locking member of the juvenile vehicle seat coupled to the lower latch mechanism of the lower yoke of the seat support.
Figure 6:
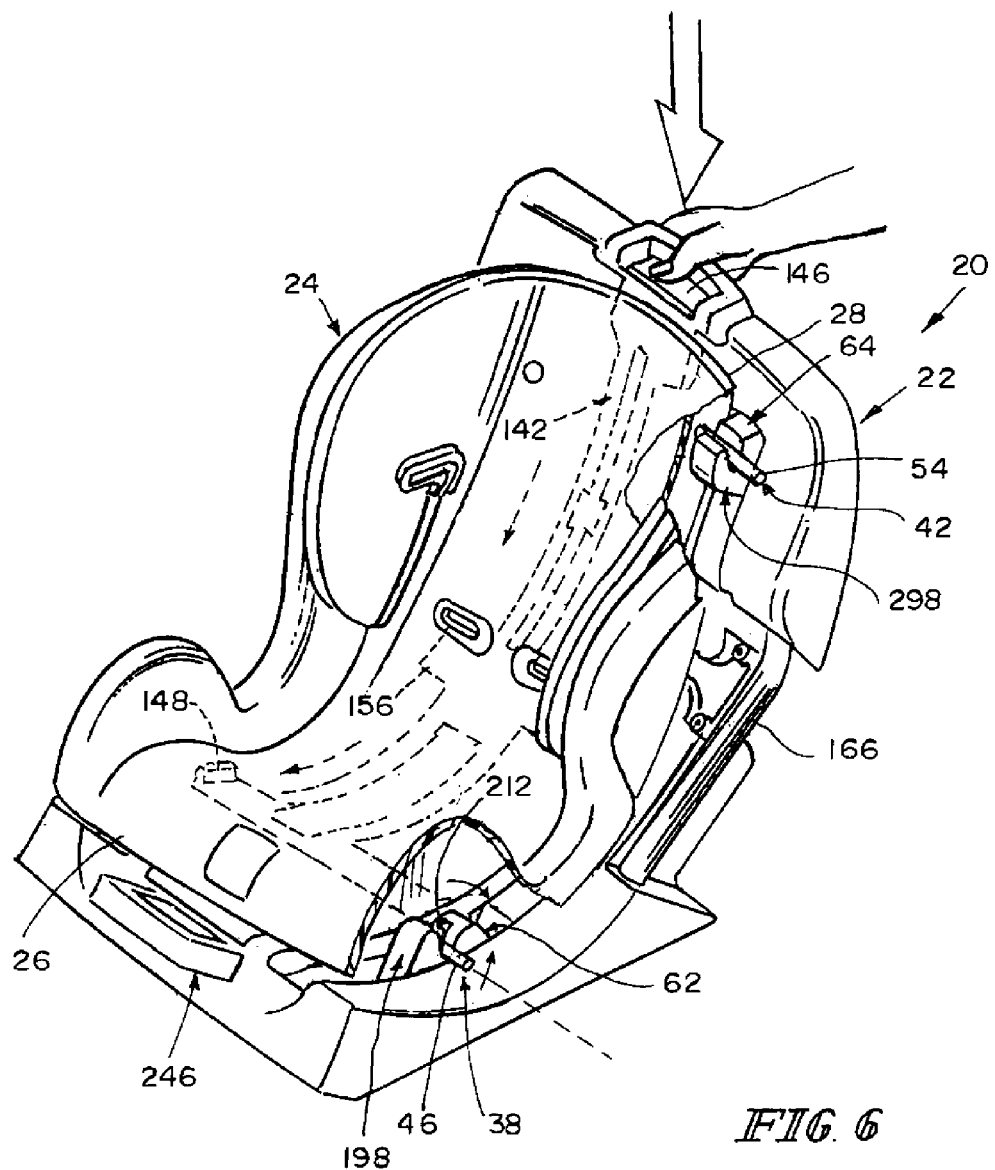
FIG. 6 is a perspective view of the child restraint showing the juvenile vehicle seat coupled to the seat support in a front-facing fully upright position, and showing the release mechanism manually moved from a retracted position as shown in FIG. 5 to an extended position wherein the lower actuator of the release mechanism uncouples the lower detent mechanism from the lower latch mechanism and actuates the lower latch mechanism such that the lower locking member of the juvenile vehicle seat may be removed from the lower latch mechanism of the seat support and such that the upper locking member of the juvenile vehicle seat may be removed from the upper latch mechanism of the upper yoke of the seat support to remove the juvenile vehicle seat from the seat support.
Figure 7:
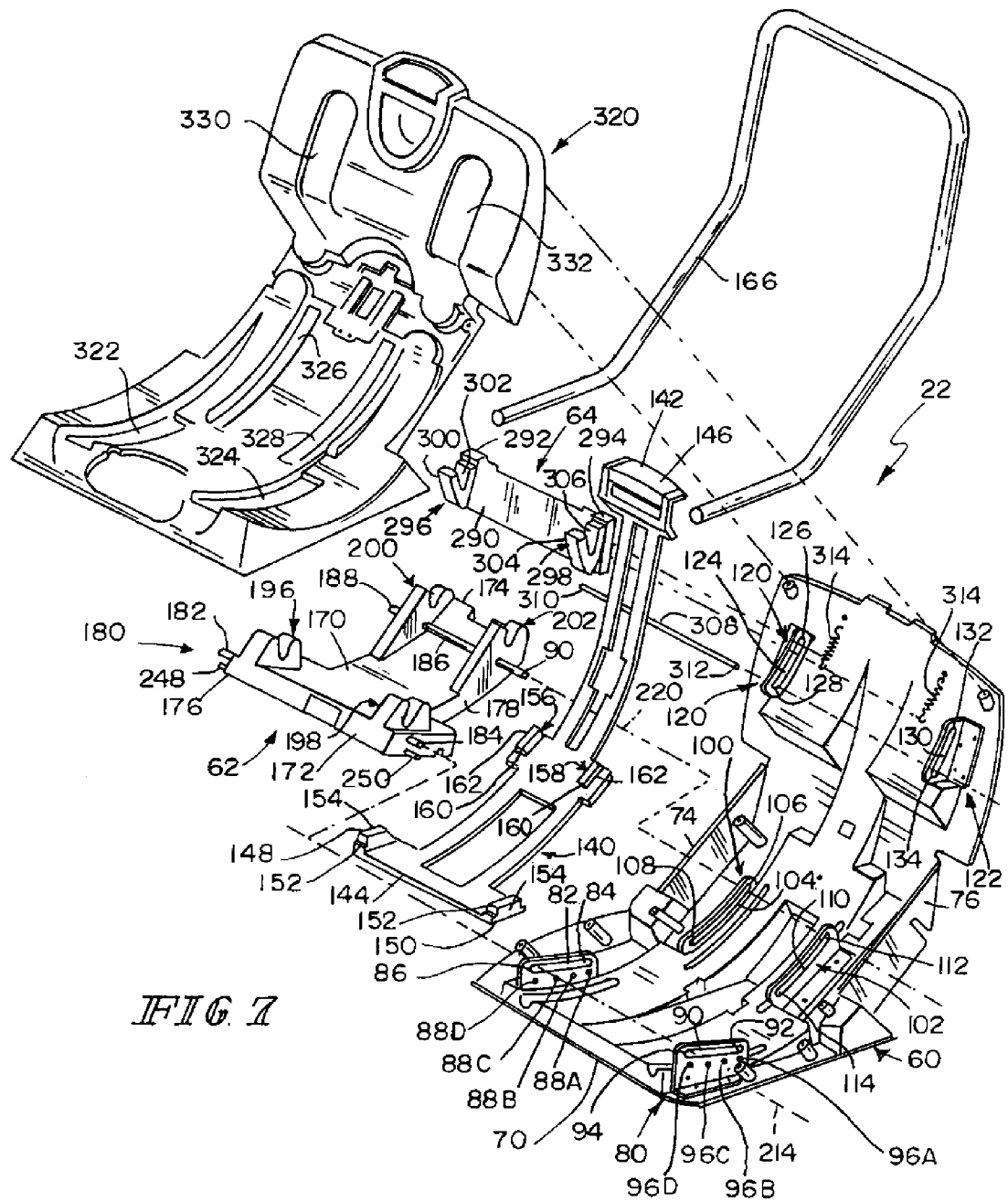
FIG. 7 is a partial exploded view of the seat support showing the seat support including a base having a pair of upper guide members, a pair of intermediate guide members and a pair of lower guide members, each guide member including an elongate slot and the lower guide members including a plurality of locking apertures located along and adjacent the slot, an upper yoke having an upper guide rod configured to be received in the slots of the upper guide members for coupling the upper yoke to the upper guide members and an upper latch mechanism for removably receiving the upper locking member of the juvenile vehicle seat when the juvenile vehicle seat is in the front-facing position, the upper yoke being movable with respect to the base of the seat support along the upper guide members between an upper position and a lower position with a pair of biasing members biasing the upper yoke toward the upper position, and showing a lower yoke including an intermediate guide rod configured to be received in the slots of the intermediate guide members and a lower guide rod configured to be received in the slots of the lower guide members such that the lower yoke is movable with respect to the intermediate guide members and the lower guide members and the base of the seat support between a fully upright position and a fully reclined position, the lower yoke including an intermediate latch mechanism and a lower latch mechanism configured to receive the lower locking member of the juvenile vehicle seat when the juvenile vehicle seat is in the front-facing position, a release mechanism disposed between the base and the upper yoke and the lower yoke including a pair of upper actuators and a pair of lower actuators, a shell configured to overlie the base including apertures through which the upper latch mechanism of the upper yoke and the intermediate latch mechanism and lower latch mechanism of the lower yoke extend, and a U-shaped frame for providing rigidity to the seat support.

When juvenile vehicle seat 24 is coupled to seat support 22 in a front-facing position with respect to seat support 22 as illustrated in FIGS. 3 and 5, first end 52 of upper locking member 42 is inserted into the receptacle of forked member 300 of first upper latch mechanism 296 and second end 54 of upper locking member 42 is inserted into the receptacle of forked member 304 of second upper latch mechanism 298 such that upper locking member 42 is coupled to upper yoke 62. First end 44 of lower locking member 48 is then inserted into forked member 204 of first lower latch mechanism 196 and second end 46 of lower locking member 38 is inserted into forked member 204 of second lower latch mechanism 198. When lower locking member 38 is inserted into first lower latch mechanism 196 and second lower latch mechanism 198, lower locking member 38 pivots hook members 212 toward their retracted positions until lower locking member 38 is fully seated within first and second lower latch mechanisms 196 and 198. Biasing members 226 then pivot hook members 212 toward their locked position such that lower locking member 38 is located within slots 222 of hook members 212. Hook members 212 of first and second lower latch mechanisms 196 and 198 thereby securely couple lower locking member 38 and juvenile vehicle seat 24 to lower yoke 62.

Figure 9:
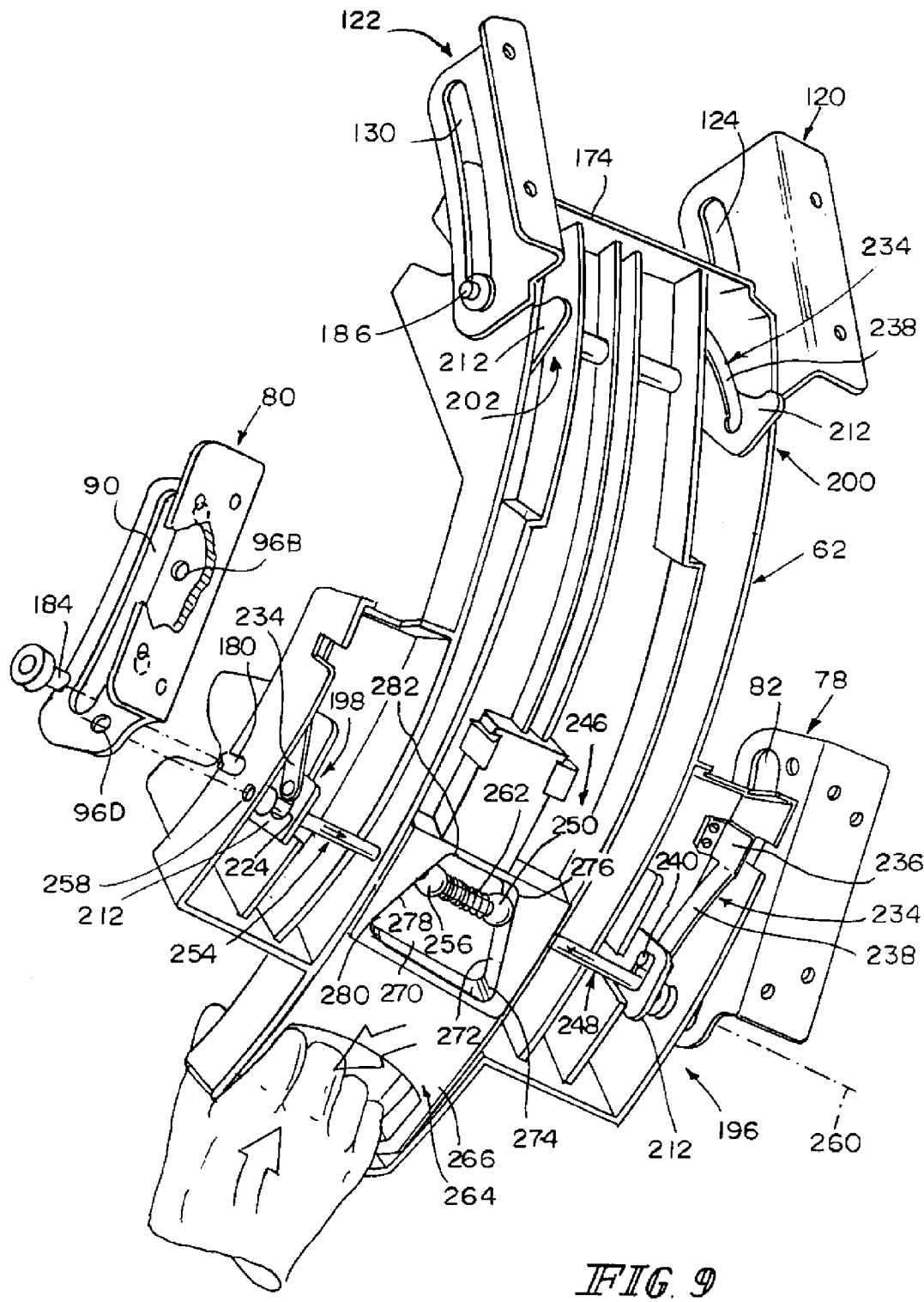
FIG. 9 is a partial exploded bottom view of the lower yoke, the intermediate guide members, and the lower guide members, showing the lower yoke in the fully reclined position with respect to the upper and lower guide members, and showing the handle of the recline adjustment mechanism manually operated to move the actuator from the locked position as shown in FIG. 8 to the released position, the actuator compressing the biasing member and moving the locking pins from the extended positions to the retracted positions when the actuator is moved to the released position such that the lower yoke may be selectively positioned with respect to the base of the seat support between the fully upright position and the fully reclined position.
Figure 10:
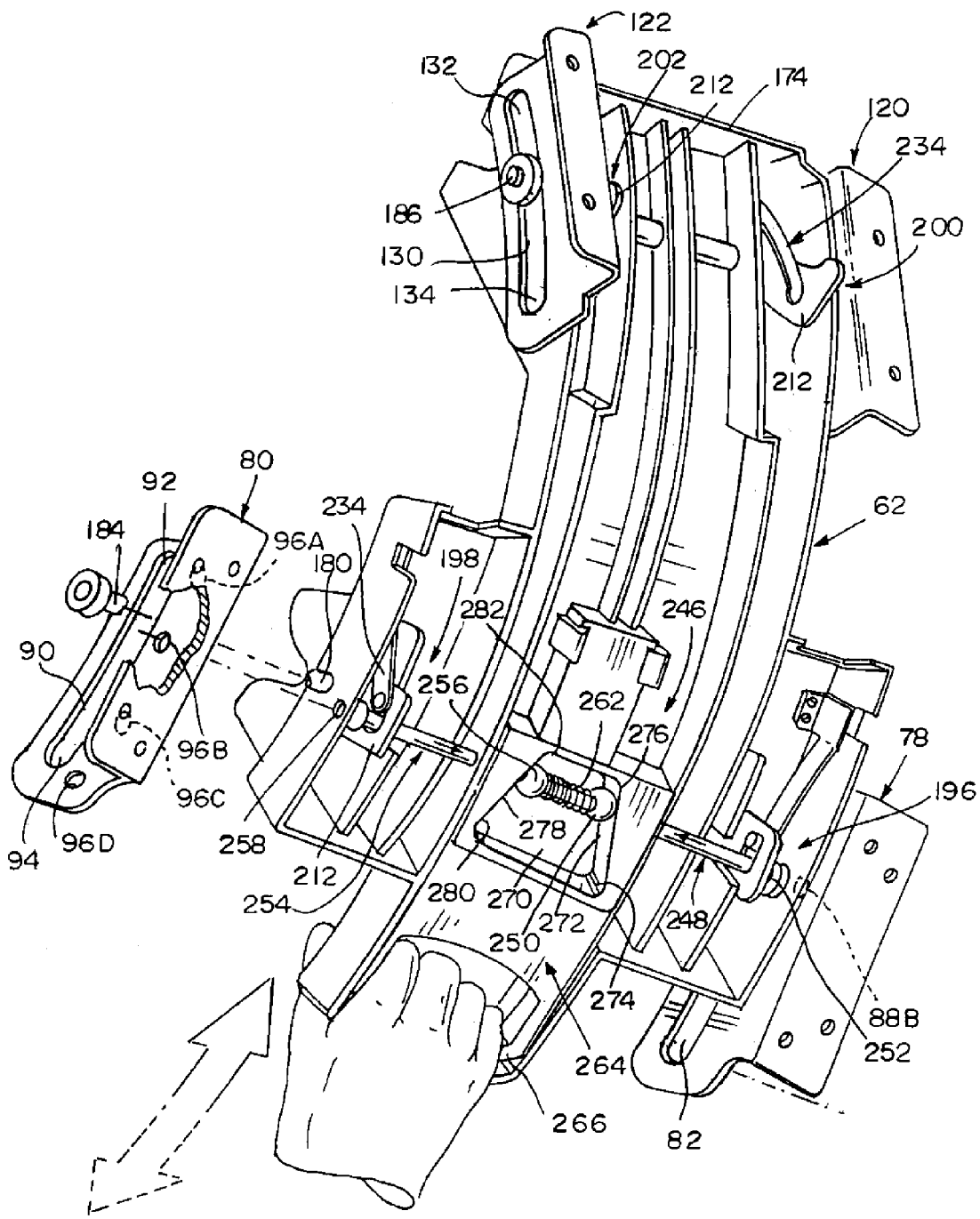
FIG. 10 is a partial exploded bottom view of the lower yoke, the intermediate guide members, and the lower guide members, showing the actuator of the recline adjustment mechanism in the released position and the locking pins in the retracted positions, with the lower yoke moved from the fully reclined position as shown in FIG. 9 toward the fully upright position, and suggesting that the lower yoke is selectively positionable with respect to the upper and lower guide members between the fully reclined position and the fully upright position.
Figure 16:
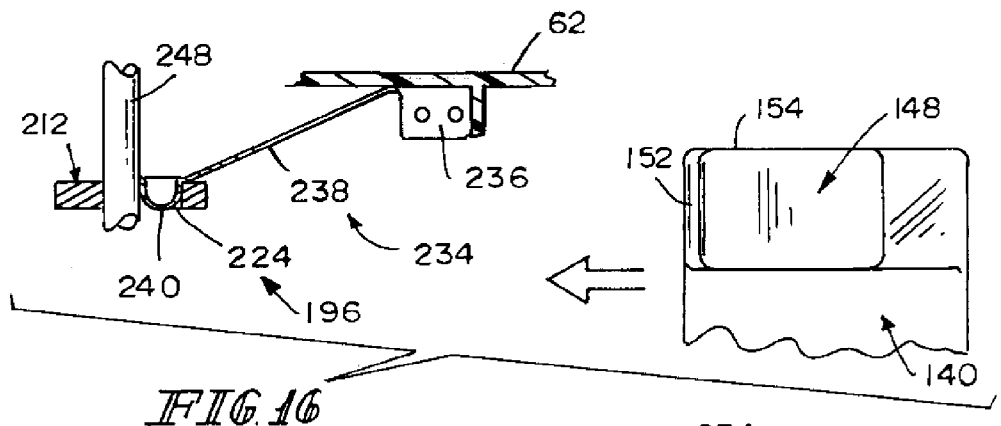

When juvenile vehicle seat 24 is coupled to seat support 22 in the front-facing position, actuator 264 of recline locking mechanism 246 may be moved from the extended position shown in FIG. 8 by manually grasping handle 266 as shown in FIG. 9 and pulling handle 266 to move actuator 264 to the released position as shown in FIG. 10. As actuator 264 moves from the locked position toward the released position, first and second side walls 272 and 278 of actuator 264 move first locking pin 248 and second locking pin 254 from their extended positions toward their retracted positions wherein proximal end 250 of first locking pin 248 is removed and released from first lower guide member 78 and distal end 258 of second locking pin 254 is removed and released from second lower guide member 80. Handle 266 may then be used manually to move and position lower yoke 62 with respect to base 60 between the fully upright position of lower yoke 62 and the fully reclined position of lower yoke 62 as desired. When lower yoke 62 is moved with respect to base 60, juvenile vehicle seat 24 and upper yoke 64 move conjointly with lower yoke 62 between their respective fully upright positions and fully reclined positions.

When it is desired to place the lower yoke 62, upper yoke 64, and juvenile vehicle seat 24 in their fully upright positions, first locking pin 248 is aligned with locking aperture 88A of first lower guide member 78 and second locking pin 254 is aligned with locking aperture 96A of second lower guide member 80. Handle 266 of recline locking mechanism 246 is then released such that biasing member 262 moves actuator 264 toward its locked position and moves first locking pin 248 and second locking pin 254 toward their extended positions wherein proximal end 250 of first locking pin 248 is located within locking aperture 88A and distal end 258 of second locking pin 254 is located within locking aperture 96A. Lower yoke 62 and juvenile vehicle seat 24 are thereby locked in place with respect to base 60. Similarly, when it is desired to place lower yoke 62, upper yoke 64, and juvenile vehicle seat 24 in their fully reclined positions, first locking pin 248 is located within locking aperture 88D of first lower guide member 78 and second locking pin 254 is located within locking aperture 96D of second lower guide member 80. Lower yoke 62, upper yoke 64, and juvenile vehicle seat 24 may be located in intermediate positions between their fully upright positions and fully reclined positions by placing first locking pin 248 within locking aperture 88B and second locking pin 254 within locking aperture 96B, or by placing first locking pin 248 within locking aperture 88C and second locking pin 254 within locking aperture 96C.

When juvenile vehicle seat 24 is coupled to seat support 22 in the front-facing position, lower locking member 38 of juvenile vehicle seat 24 is coupled to base 60 by hook members 212 of first and second lower latch mechanisms 196 and 198 as generally illustrated in FIG. 13 in connection with first lower latch mechanism 196. When hook members 212 are in the locked position as shown in FIG. 13, detent 240 of detent mechanism 234 is located within slot 224 of hook member 212 by arm member 238 such that detent 240 prevents hook member 212 from pivoting from the locked position toward the released position. Juvenile vehicle seat 24 is thereby locked to lower yoke 62.

Figure 17:
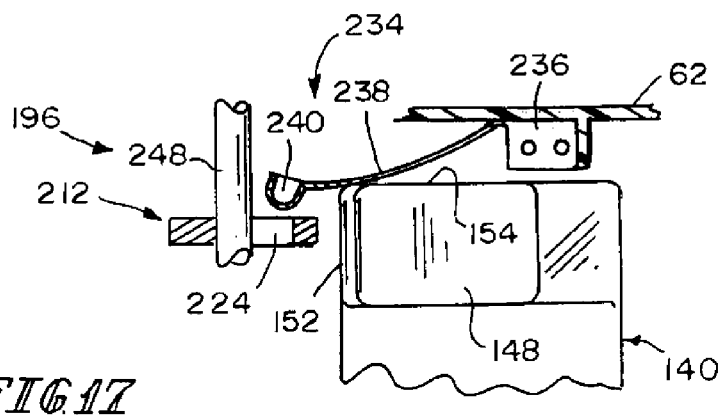

When it is desired to remove juvenile vehicle seat 24 from seat support 22, juvenile vehicle seat 24 and lower yoke 62 are placed in their fully upright positions as shown in FIGS. 6 and 13-18. Operating member 146 of release mechanism 140 is pressed manually to move release mechanism 140 from the retracted position to the extended position. As release mechanism 140 moves from the retracted position toward the extended position as suggested in FIGS. 13 and 16, first lower actuator 148 moves toward detent mechanism 234 and hook member 212 of first lower latch mechanism 196. As shown in FIGS. 14 and 17, as release mechanism 140 continues to move toward the extended position, side wall 154 of first lower actuator 148 engages arm member 238 of detent mechanism 234 and moves detent 240 out of slot 224 of hook member 212 such that hook member 212 may be pivoted from the locked position to the released position.

Figure 18:
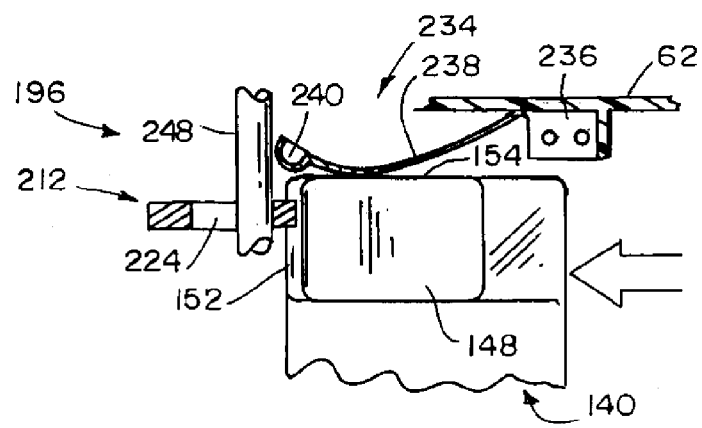

As shown in FIGS. 15 and 18, further movement of release mechanism 140 toward the extended position, end wall 152 of first lower actuator 148 engages bottom end 216 of hook member 212 and hook member 212 is pivoted from the locked position to the released position such that lower locking member 38 of juvenile vehicle seat 24 may be removed from first lower latch mechanism 196. Second lower actuator 150 of release mechanism 140 operates detent mechanism 234 and hook member 212 of second lower latch mechanism 198 in the same manner that first lower actuator 148 operates detent mechanism 234 and hook member 212 of second lower latch mechanism 198 for the release of lower locking member 38 from second lower latch mechanism 198. When hook members 212 of first and second lower latch mechanisms 196 and 198 are in the released position and lower locking member 38 is removed from first and second lower latch mechanisms 196 and 198, upper locking member 42 of juvenile vehicle seat 24 may be removed from first upper latch mechanism 296 and second upper latch mechanism 298 of upper yoke 64.

When lower yoke 62, upper yoke 64 and juvenile vehicle seat 24 are not located in their fully upright positions, such as when first locking pin 248 is located in locking apertures 88B, 88C or 88D and second locking pin 254 is correspondingly located in locking apertures 96B, 96C or 96D, detent mechanisms 234 and hook members 212 of first and second lower latch mechanisms 196 and 198 are out of range to be engaged by first and second lower actuators 148 and 150 of release mechanism 140 when release mechanism 140 is in the extended position. Release mechanism 140 is therefore inoperable to release detent 240 from hook member 212 in first lower latch mechanism 196 and in second lower latch mechanism 198 when lower yoke 62 is not in the fully upright position. Juvenile vehicle seat 24 may therefore only be removed from seat support 22 when lower yoke 62 and juvenile vehicle seat 24 are in their fully upright positions.

Figure 19:
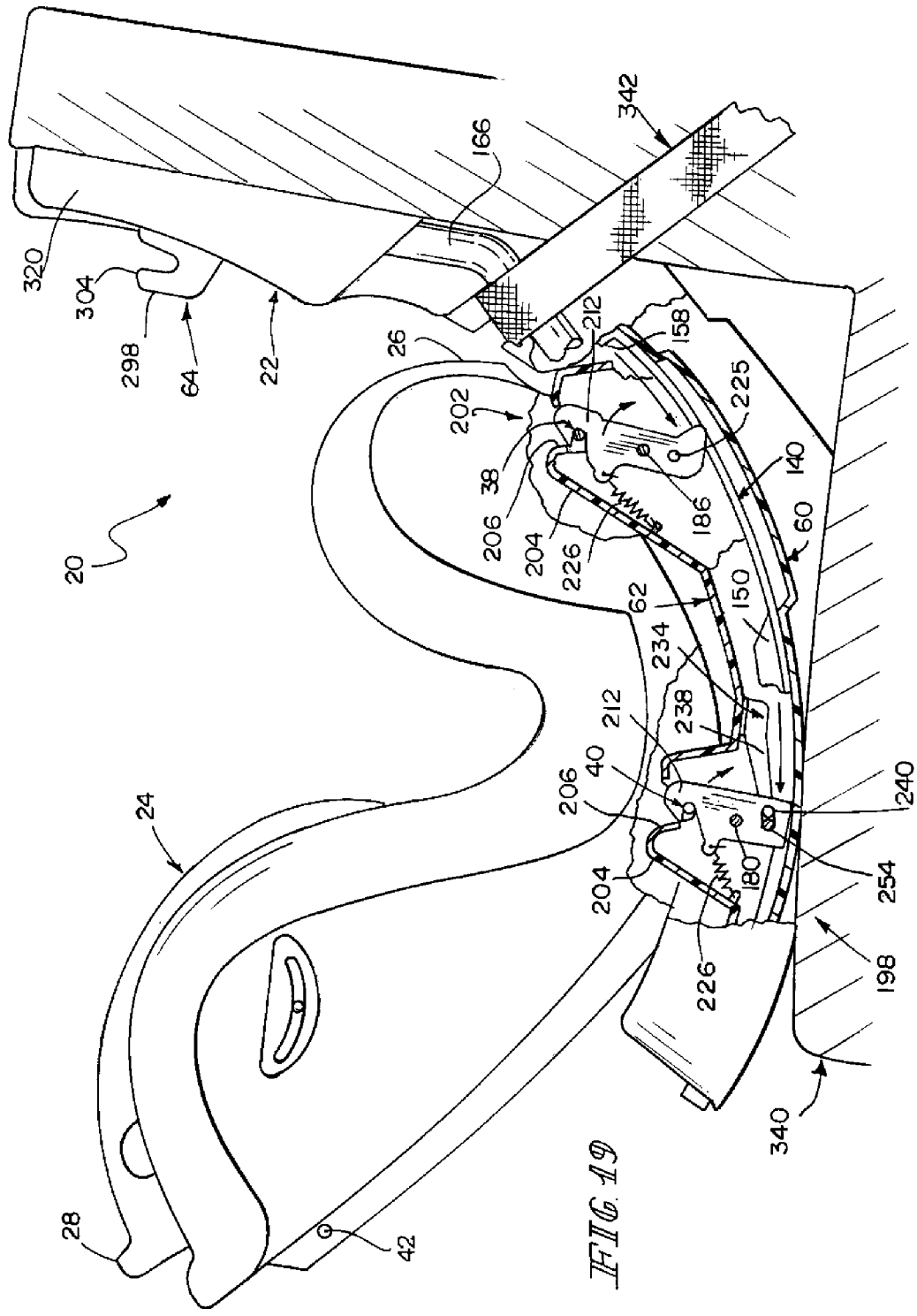
FIG. 19 is a partially cut away side view showing the child restraint in accordance with the present disclosure coupled to the seat of a vehicle by a belt, the child restraint includes a seat support shown positioned on the vehicle seat and a juvenile vehicle seat shown coupled to the seat support in a rear-facing position with the lower locking member of the juvenile vehicle seat coupled to the intermediate latch mechanism of the lower yoke and the intermediate locking member of the juvenile vehicle seat coupled to the lower latch mechanism of the lower yoke, and suggesting that the hook members of the intermediate latch mechanism and the lower latch mechanism are pivotable from the locked position to the released position by the upper and lower actuators of the release mechanism to release the juvenile vehicle seat from the seat support.
Figure 20:
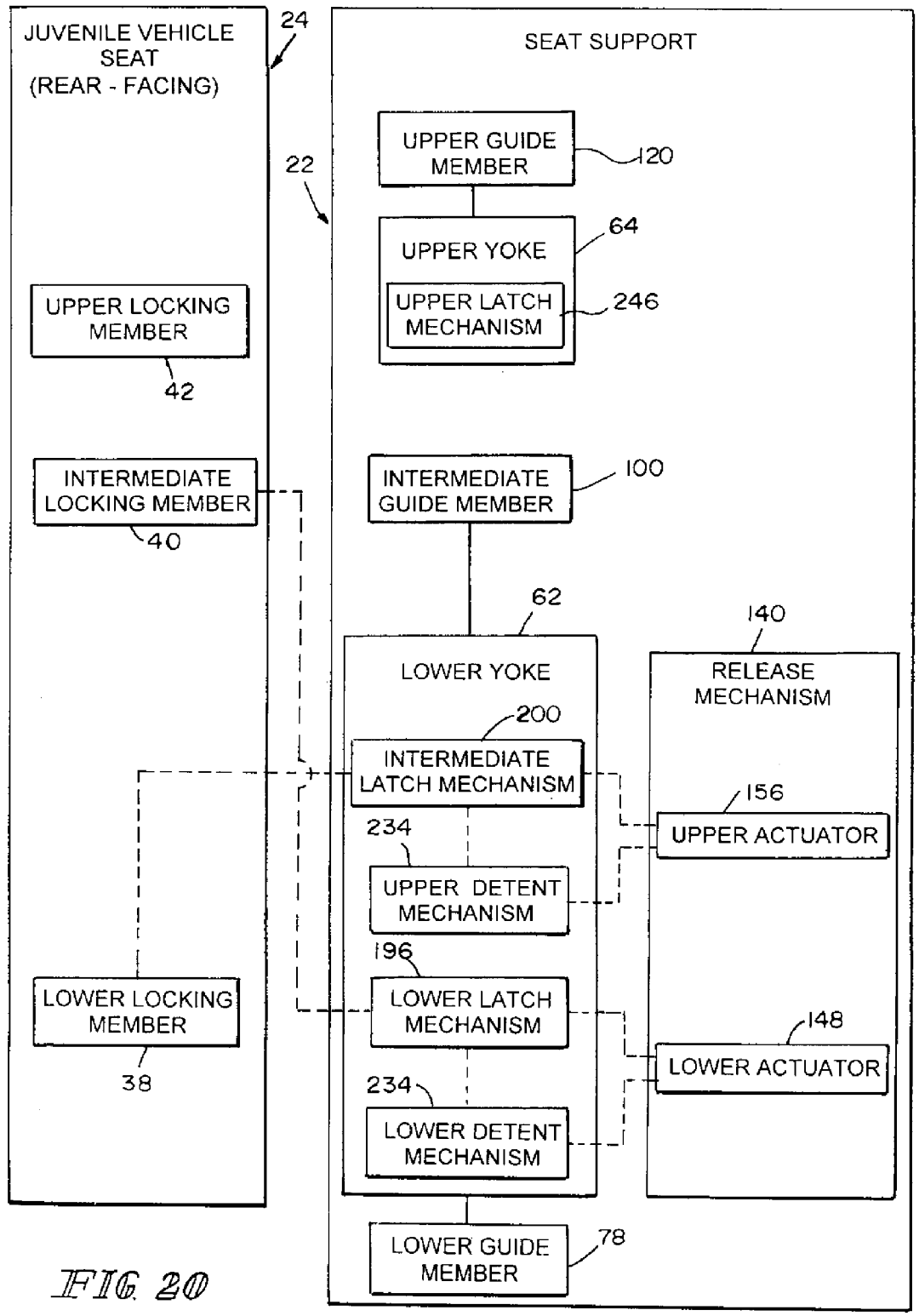
FIG. 20 is a diagrammatic view of the child restraint in accordance with the present disclosure, the child restraint including a rear-facing juvenile vehicle seat having an upper locking member, an intermediate locking member and a lower locking member, and a seat support including an upper yoke coupled to an upper guide member, the upper yoke including an upper latch mechanism, and a lower yoke coupled to an intermediate guide member and a lower guide member, the lower yoke including an intermediate latch mechanism configured to receive the lower locking member of the juvenile vehicle seat when the juvenile vehicle seat is in the rear-facing position and a lower latch mechanism configured to receive the intermediate locking member of the juvenile vehicle seat when the juvenile vehicle seat is in the rear-facing position, the lower yoke including an upper detent mechanism for releasably locking the lower locking member to the intermediate latch mechanism when the juvenile vehicle seat is in the rear-facing position and a lower detent mechanism for releasably locking the intermediate locking member of the juvenile vehicle seat to the lower latch mechanism when the juvenile vehicle seat is in the rear-facing position, the seat support further including a release mechanism having an upper actuator configured to actuate the upper detent mechanism and the intermediate latch mechanism and a lower actuator configured to actuate the lower detent mechanism and the lower latch mechanism when the juvenile vehicle seat is in the fully upright position to selectively release the lower locking member of the juvenile vehicle seat from the intermediate latch mechanism and to selectively release the intermediate locking member of the juvenile vehicle seat from the lower latch mechanism.

While juvenile vehicle seat 24 may be coupled to seat support 22 in a front-facing position as shown in FIG. 1, juvenile vehicle seat 24 may alternatively be coupled to seat support 22 in a rear-facing position with respect to seat support 22 as shown in FIG. 19. Seat support 22 as shown in FIG. 19 is secured to a vehicle seat 340 by a belt 342. Intermediate locking member 40 of juvenile vehicle seat 24 is inserted into first and second lower latch mechanisms 196 and 198 and lower locking member 38 of juvenile vehicle seat 24 is inserted into first and second intermediate latch mechanisms 200 and 202 of lower yoke 62 to couple to juvenile vehicle seat 24 to lower yoke 62 and seat support 22 in the rear-facing position. First end 44 of lower locking member 38 is coupled to hook member 212 of second intermediate latch mechanism 202 and second end 46 of lower locking member 38 is coupled to hook member 212 of first intermediate latch mechanism 200. First end 48 of intermediate locking member 40 is coupled to hook member 212 of second lower latch mechanism 198 and second end 50 of intermediate locking member 40 is coupled to hook member 212 of first lower latch mechanism 196. Detent mechanisms 234 and hook members 212 of first and second lower latch mechanisms 196 and 198 and of first and second intermediate latch mechanisms 200 and 202 couple juvenile vehicle seat 24 to lower yoke 62 of seat support 22 in the rear-facing position in the same manner that first and second lower latch mechanisms 196 and 198 couple juvenile vehicle seat 24 to lower yoke 62 in the front-facing position. Release mechanism 140 may be used selectively to position lower yoke 62 and juvenile vehicle seat 24 between fully upright and fully reclined positions as described in connection with the front-facing orientation of juvenile vehicle seat 24. Upper yoke 64 is not coupled to juvenile vehicle seat 24 when juvenile vehicle seat 24 is in the rear-facing position.

Rear-facing juvenile vehicle seat 24 may be removed from seat support 22 by moving release mechanism 140 from the retracted position toward the extended position. As described in connection with the front-facing orientation of juvenile vehicle seat 24, first and second lower actuators 148 and 150 of release mechanism 140 engage arm members 238 of detent mechanisms 234 to remove detents 240 from slots 224 in hook members 212 of first and second lower latch mechanisms 196 and 198 and pivot hook members 212 of first and second lower latch mechanisms 196 and 198 to the released position. Similarly, when release mechanism 140 is moved toward the extended position, first upper actuator 156 biases arm member 238 of detent mechanism 234 of first intermediate guide member 100 outwardly to remove detent 240 from aperture 225 of hook member 212 and pivots hook member 212 to the released position. In the same manner, second upper actuator 158 of release mechanism 140 engages arm member 238 of detent mechanism 234 of second intermediate latch mechanism 202 and moves detent 240 out of aperture 225 of hook member 212 and pivots hook member 212 to the released position.

When juvenile vehicle seat 24 is in the rear-facing position, juvenile vehicle seat 24 is in the fully upright position when bottom end 26 is fully raised and juvenile vehicle seat 24 is in the fully reclined position when bottom end 26 is fully lowered with respect to seat support 22. When juvenile vehicle seat 24 is in the rear-facing position, and juvenile vehicle seat 24 and lower yoke 62 are in their fully upright positions, release mechanism 140 may be moved to the extended position to thereby release lower locking member 38 from first and second intermediate latch mechanisms 200 and 202 and to release intermediate locking member 40 from first lower latch mechanism 196 and second lower latch mechanism 198. When lower yoke 62 is not in the fully upright position, detent mechanisms 234 and hook members 212 of first and second lower latch mechanisms 196 and 198 and of first and second intermediate latch mechanisms 200 and 202 are out of range for engagement by first and second lower actuators 148 and 150 and first and second upper actuators 156 and 158 of release mechanism 140. When juvenile vehicle seat 24 is coupled to lower yoke 62 in the rear-facing position, juvenile vehicle seat 24 may only be removed from lower yoke 62 when lower yoke 62 is in the fully upright position, and cannot be removed from lower yoke 62 when lower yoke 62 is not in the fully upright position.

The invention claimed is:

1. A seat support adapted to receive a juvenile vehicle seat, the seat support comprising
a base,
a lower yoke coupled to the base and adapted to receive the juvenile vehicle seat, and
positioning means for selectively positioning the lower yoke with respect to the base between an upright position of the lower yoke and a reclined position of the lower yoke,
wherein the base includes a first guide member including a plurality of first locking apertures and a first elongate slot and a second guide member including a plurality of second locking apertures and a second elongate slot, the lower yoke is slidably coupled to the first guide member and the second guide member, the lower yoke includes a first lower guide rod operatively associated with the first elongate slot and a second lower guide rod operatively associated with the second elongate slot, and the lower yoke includes a first locking pin having a distal end configured to be located in a selected one of the plurality of first locking apertures and a second locking pin having a distal end configured to be located in a selected one of the plurality of second locking apertures such that the lower yoke is locked in place with respect to the base.

2. The seat support of claim 1, wherein the base includes an intermediate guide member including a third elongate slot and an intermediate guide rod operatively associated with the third elongate slot of the intermediate guide member such that the lower yoke is coupled to the base and is slidably movable with respect to the base between the upright position of the lower yoke and the reclined position of the lower yoke.

3. The seat support of claim 2, wherein the lower yoke includes an actuator configured to selectively retract the first and second locking pins from the first and second guide members such that the lower yoke is selectively movable with respect to the base.

4. The seat support of claim 1, wherein the first locking pin includes a proximal end, the second locking pin includes a proximal end, the first locking pin and the second locking pin are arranged to lie in a generally coaxial relation with one another, the positioning means further comprises a resilient biasing member extending between the proximal end of the first locking pin and the proximal end of the second locking pin, the biasing member resiliently biasing the first locking pin toward an extended position wherein the distal end of the first locking member is located within a first locking aperture of the first guide member and resiliently biasing the second locking pin toward an extended position wherein the distal end of the second locking pin is located within a second locking aperture of the second guide member.

5. The seat support of claim 4, wherein the lower yoke includes an actuator arranged to be movable manually between a locked position and a released position, the actuator includes a first side wall having a first end and a second end and a spaced apart second side wall having a first end and a second end, the first side wall and the second side wall are inclined with respect to one another such that the second ends of the first and second side walls are located more closely together than the first ends of the first and second side walls, the proximal end of the first locking pin is slidably associated with the first side wall and the proximal end of the second locking pin is slidably associated with the second side wall such that when the actuator moves from the locked position toward the released position the first and second side walls compress the biasing member, and the first side wall moves the first locking pin toward a retracted position wherein the first locking pin is released from the first guide member and the second side wall moves the second locking pin toward a retracted position wherein the second locking pin is released from the second guide member.

6. A seat support adapted to receive a juvenile vehicle seat, the seat support comprising
a base,
a lower yoke coupled to the base and adapted to receive the juvenile vehicle seat,
positioning means for selectively positioning the lower yoke with respect to the base between an upright position of the lower yoke and a reclined position of the lower yoke,
further comprising an upper yoke coupled to the base and adapted to receive the juvenile vehicle seat, the upper yoke being movable with respect to the base between an upright position and a reclined position, and
further comprising a biasing member having a first end coupled to the base and a second end coupled to the upper yoke, the biasing member resiliently biasing the upper yoke from the reclined position toward the upright position.

7. The seat support of claim 6, wherein the base includes an upper guide member having an elongate slot and the upper yoke includes an upper guide rod operatively associated with the slot of the upper guide member such that the upper guide rod is slidable along the slot when the lower yoke moves between the upright position and the reclined position.

8. A seat support adapted to receive a juvenile vehicle seat, the seat support comprising
a base,
a lower yoke coupled to the base and adapted to receive the juvenile vehicle seat, the lower yoke being selectively positionable with respect to the base between an upright position of the lower yoke and a reclined position of the lower yoke,
locking means for preventing removal of the juvenile vehicle seat from the lower yoke when the lower yoke is not in the upright position while allowing removal of the juvenile vehicle seat from the lower yoke when the lower yoke is in the upright position,
wherein the lower yoke includes a latch mechanism having a hook member for coupling the juvenile vehicle seat to the lower yoke and the hook member is movable between a locked position wherein the juvenile vehicle seat is secured to the lower yoke and a released position wherein the juvenile vehicle seat is removable from the lower yoke, and
further comprising an upper yoke coupled to the base and adapted to receive the juvenile vehicle seat, the upper yoke being selectively positionable with respect to the base between an upright position of the upper yoke and a reclined position of the upper yoke, the seat support including a biasing member coupled to the base and to the upper yoke, the biasing member resiliently biasing the upper yoke toward the upright position of the upper yoke, and the upper yoke being adapted to move conjointly with the lower yoke between the upright positions of the upper and lower yokes and the reclined positions of the upper and lower yokes when the juvenile vehicle seat is coupled to the upper and lower yokes.

9. The seat support of claim 8, wherein the lower yoke includes a biasing member coupled to the hook member and the biasing member is arranged to yieldably bias the hook member toward the locked position.

10. A seat support adapted to receive a juvenile vehicle seat, the seat support comprising
a base,
a lower yoke coupled to the base and adapted to receive the juvenile vehicle seat, the lower yoke being selectively positionable with respect to the base between an upright position of the lower yoke and a reclined position of the lower yoke,
locking means for preventing removal of the juvenile vehicle seat from the lower yoke when the lower yoke is not in the upright position while allowing removal of the juvenile vehicle seat from the lower yoke when the lower yoke is in the upright position,
wherein the lower yoke includes a latch mechanism having a hook member for coupling the juvenile vehicle seat to the lower yoke and the hook member is movable between a locked position wherein the juvenile vehicle seat is secured to the lower yoke and a released position wherein the juvenile vehicle seat is removable from the lower yoke,
wherein the lower yoke includes a detent mechanism configured to engage the hook member and prevent movement of the hook member from the locked position to the released position, and wherein the lower yoke includes a release mechanism having an actuator, the actuator is arranged to be movable manually between a retracted position and an extended position, the actuator is configured to release the detent mechanism from the hook member and to move the hook member toward the released position when the lower yoke is in the upright position and the actuator is moved to the extended position, and the detent mechanism and the hook member are arranged to lie out of range for engagement by the actuator when the lower yoke is not in the upright position such that the juvenile vehicle seat can not be removed from the lower yoke when the lower yoke is not in the upright position.

11. The seat support of claim 10, wherein the hook member includes an aperture, the detent mechanism includes a detent at the distal end of a flexible arm, and the flexible arm yieldably biases the detent into the aperture of the hook member when the hook member is in the locked position to prevent movement of the hook member to the released position.

12. A seat support adapted to receive a juvenile vehicle seat, the seat support comprising
a base,
an upper yoke coupled to the base and adapted to receive the juvenile vehicle seat, the upper yoke being selectively movable with respect to the base between an upright position of the upper yoke and a retracted position of the upper yoke,
a lower yoke coupled to the base and adapted to receive the juvenile seat, the lower yoke being selectively movable with respect to the base between an upright position of the lower yoke and a reclined position of the lower yoke independently of movement of the upper yoke, the upper yoke being movable toward the upright position of the upper yoke when the lower yoke is moved toward the upright position of the lower yoke and the juvenile vehicle seat is coupled to the upper yoke and the lower yoke, and the upper yoke being movable toward the reclined position of the upper yoke when the lower yoke is moved toward the reclined position of the lower yoke and the juvenile vehicle seat is coupled to the upper yoke and the lower yoke, and
further comprising a biasing member having a first end coupled to the base and a second end coupled to the upper yoke, the biasing member resiliently biasing the upper yoke toward the upright position of the upper yoke.

13. The seat support of claim 12, wherein the upper yoke includes an upper latch mechanism adapted to receive the juvenile vehicle seat.

14. A seat support adapted to receive a juvenile vehicle seat, the seat support comprising
a base,
an upper yoke coupled to the base and adapted to receive the juvenile vehicle seat, the upper yoke being selectively movable with respect to the base between an upright position of the upper yoke and a retracted position of the upper yoke,
a lower yoke coupled to the base and adapted to receive the juvenile seat, the lower yoke being selectively movable with respect to the base between an upright position of the lower yoke and a reclined position of the lower yoke independently of movement of the upper yoke, the upper yoke being movable toward the upright position of the upper yoke when the lower yoke is moved toward the upright position of the lower yoke and the juvenile vehicle seat is coupled to the upper yoke and the lower yoke, and the upper yoke being movable toward the reclined position of the upper yoke when the lower yoke is moved toward the reclined position of the lower yoke and the juvenile vehicle seat is coupled to the upper yoke and the lower yoke, wherein the lower yoke includes a lower latch mechanism adapted to receive the juvenile vehicle seat and an intermediate latch mechanism adapted to receive the juvenile vehicle seat, the lower latch mechanism includes a first hook member for engaging the juvenile vehicle seat, the first hook member is arranged to move between a locked position and a released position, the intermediate latch mechanism includes a second hook member for engaging the juvenile vehicle seat, and the second hook member is arranged to move between a locked position and a released position, and wherein the first hook member includes a first aperture, the second hook member includes a second aperture, and the lower yoke further comprises a lower detent mechanism having a first detent configured to be inserted into the first aperture of the first hook member to prevent movement of the first hook member from the locked position to the released position and an upper detent mechanism having a second detent configured to be inserted into the second aperture of the second hook member to prevent movement of the second hook member from the locked position to the released position.

15. The seat support of claim 14, further comprising a release mechanism having a lower actuator and an upper actuator, the release mechanism being movable between a retracted position and an extended position, the lower actuator being configured to move the first detent of the lower detent mechanism out of the first aperture of the first hook member and to move the first hook member to the released position when the release mechanism is moved from the retracted position to the extended position, and the upper actuator being configured to move the second detent of the upper detent mechanism out of the second aperture of the second hook member and to move the second hook member to the released position when the release mechanism is moved from the retracted position to the extended position.

16. A child restraint for the receipt of a juvenile, the child restraint comprising
a juvenile vehicle seat having a lower locking member, an intermediate locking member, and an upper locking member,
a seat support configured to receive the juvenile vehicle seat, the seat support including a base, an upper yoke coupled to the base and being movable with respect to the base, and a lower yoke coupled to the base, the upper yoke including an upper latch mechanism configured to receive the upper locking member of the juvenile vehicle seat when the juvenile vehicle seat is in a front-facing position with respect to the seat support, the lower yoke including a lower latch mechanism configured to receive the lower locking member of the juvenile vehicle seat when the juvenile vehicle seat is in the front-facing position with respect to the seat support and configured to receive the intermediate locking member of the juvenile vehicle seat when the juvenile vehicle seat is in a rear-facing position with respect to the seat-support and an intermediate latch mechanism configured to receive the lower locking member of the juvenile vehicle seat when the juvenile vehicle seat is in the rear-facing position with respect to the seat support, and wherein the lower locking member comprises an elongate first rod having a first end and a second end, the intermediate locking member comprises an elongate second rod having a first end and a second end, the upper locking member comprises an elongate third rod having a first end and a second end, and the first ends and the second ends of the first rod, second rod and third rod are configured to be coupled to the seat support.

* * * * *